US012114599B2

(12) United States Patent
Wolf et al.

(10) Patent No.: US 12,114,599 B2
(45) Date of Patent: Oct. 15, 2024

(54) CUTTING MECHANISM FOR A LAWNMOWER AND/OR A MOTOR SCYTHE, LAWNMOWER AND/OR MOTOR SCYTHE AND METHOD FOR ASSEMBLING A CUTTING MECHANISM AND/OR A LAWNMOWER AND/OR A MOTOR SCYTHE

(71) Applicant: Andreas Stihl AG & Co. KG, Waiblingen (DE)

(72) Inventors: Philip Wolf, Ebbs (AT); Markus Gassner, Koessen (AT); Marko Fiebig, Langkampfen (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 329 days.

(21) Appl. No.: 17/215,062

(22) Filed: Mar. 29, 2021

(65) Prior Publication Data

US 2021/0298232 A1    Sep. 30, 2021

(30) Foreign Application Priority Data

Mar. 30, 2020 (EP) .................................. 20166760

(51) Int. Cl.
*A01D 34/73* (2006.01)
*A01D 34/00* (2006.01)
*A01D 101/00* (2006.01)

(52) U.S. Cl.
CPC ......... *A01D 34/733* (2013.01); *A01D 34/736* (2013.01); *A01D 34/008* (2013.01); *A01D 2101/00* (2013.01)

(58) Field of Classification Search
CPC ... A01D 34/733; A01D 34/736; A01D 34/008
See application file for complete search history.

(56) References Cited

U.S. PATENT DOCUMENTS 3,507,104 A * 4/1970 Kline .................. A01D 34/733
56/295
3,604,189 A * 9/1971 Harer .................. A01D 34/664
56/295

(Continued)

FOREIGN PATENT DOCUMENTS

DE    20 58 347 A1    6/1972
EP    0 517 645 A1    12/1992

(Continued)

OTHER PUBLICATIONS

German-language European Search Report issued in European Application No. 20166760.7 dated Aug. 13, 2020 with partial English translation (seven (7) pages).

(Continued)

*Primary Examiner* — Thomas B Will
*Assistant Examiner* — Julia C Tran
(74) *Attorney, Agent, or Firm* — Crowell & Moring LLP

(57) ABSTRACT

A cutting mechanism for a lawnmower and/or a motor scythe has at least one tool device, a tool connecting device, and a securing device. The tool device is designed for cutting grass. The tool connecting device is designed for rotation around a cutting mechanism rotation axis of the cutting mechanism. The tool connecting device and the tool device are designed to form a positive connection to one another in order to secure the positively connected tool device against being released from the tool connecting device radially in a radial direction with respect to the cutting mechanism rotation axis. The securing device and the tool connecting device are designed to be at least partially adjustable relative to one another in, or counter to, an at least partial radial direction at least section-by-section between an enable position for enabling production and/or release of the positive connec- (Continued)

tion and a securing position for securing the positive connection against release.

16 Claims, 13 Drawing Sheets

(56) References Cited

U.S. PATENT DOCUMENTS

| | | | | |
|---|---|---|---|---|
| 3,958,402 | A * | 5/1976 | Bouet | A01D 34/733 56/295 |
| 4,313,297 | A * | 2/1982 | Maier | A01D 34/733 56/295 |
| 4,525,990 | A * | 7/1985 | Zweegers | A01D 34/733 56/13.6 |
| 4,996,828 | A * | 3/1991 | Jetzinger | A01D 34/733 56/295 |
| 5,622,035 | A * | 4/1997 | Kondo | A01D 34/736 56/DIG. 17 |
| 6,829,878 | B1 * | 12/2004 | Hoffman | A01D 34/736 56/295 |
| 8,857,038 | B2 * | 10/2014 | Fay, II | A01D 34/736 29/525.01 |
| 2004/0177484 | A1 * | 9/2004 | Thompson | A01D 34/736 29/402.03 |
| 2008/0196255 | A1 | 8/2008 | Strader | |
| 2009/0308044 | A1 | 12/2009 | Bever | |
| 2011/0194885 | A1 * | 8/2011 | Whitenight | A01D 34/736 403/11 |
| 2017/0006776 | A1 * | 1/2017 | Svensson | A01D 34/736 |
| 2019/0183042 | A1 * | 6/2019 | Cmich | A01D 34/81 |
| 2021/0185911 | A1 * | 6/2021 | Agerhall | A01D 34/78 |

FOREIGN PATENT DOCUMENTS

| | | |
|---|---|---|
| EP | 3 102 021 B1 | 3/2020 |
| FR | 2 770 964 A1 | 5/1999 |
| KR | 20-0207294 Y1 | 12/2000 |
| WO | WO 2015/115955 A1 | 8/2015 |

OTHER PUBLICATIONS

Cover Page of EP 3 102 021 A1 published Dec. 14, 2016 (one (1) page).
German-language European Office Communication issued in European Application No. 20166760.7 dated Sep. 28, 2022 with partial English translation (five (5) pages).
German-language European Office Action issued in European Application No. 20 166 760.7 dated Apr. 12, 2023 (5 pages).

* cited by examiner

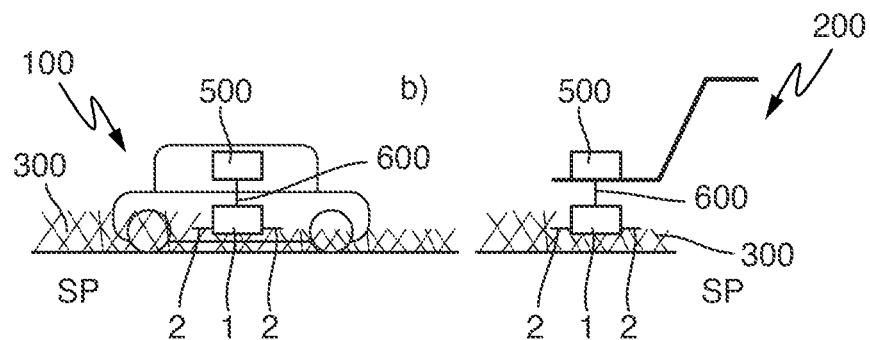
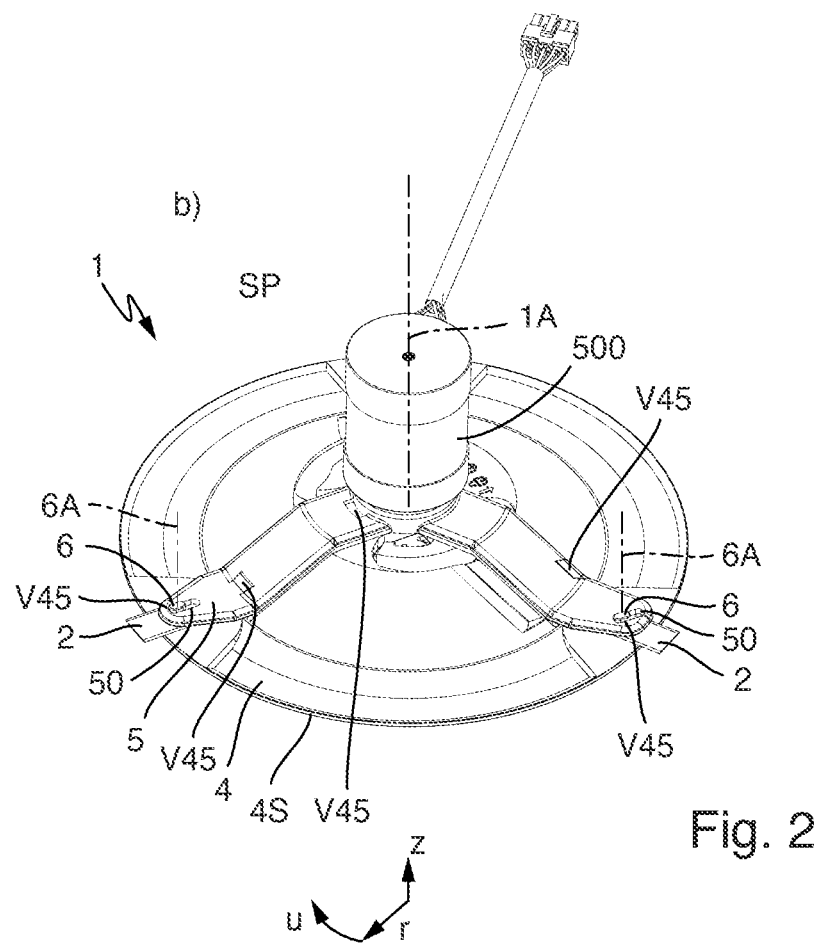

CUTTING MECHANISM FOR A LAWNMOWER AND/OR A MOTOR SCYTHE, LAWNMOWER AND/OR MOTOR SCYTHE AND METHOD FOR ASSEMBLING A CUTTING MECHANISM AND/OR A LAWNMOWER AND/OR A MOTOR SCYTHE

CROSS REFERENCE TO RELATED APPLICATION

This application claims priority under 35 U.S.C. § 119 from European Patent Application No. 20166760.7, filed Mar. 30, 2020, the entire disclosure of which is herein expressly incorporated by reference.

BACKGROUND AND SUMMARY OF THE INVENTION

The invention relates to a cutting mechanism for a lawnmower and/or for a motor scythe, to a lawnmower and/or a motor scythe having a cutting mechanism of this kind, and to a method for assembling a cutting mechanism of this kind and/or a lawnmower of this kind and/or a motor scythe of this kind.

The invention is based on the object of providing a cutting mechanism for a lawnmower and/or for a motor scythe, a lawnmower and/or a motor scythe having a cutting mechanism of this kind, and/or a method for assembling a cutting mechanism of this kind and/or a lawnmower of this kind and/or a motor scythe of this kind, which each have/has improved characteristics.

The invention solves this problem by providing a cutting mechanism, a lawnmower and/or a motor scythe, and by providing a method, in accordance with the independent claims. Advantageous developments and/or embodiments of the invention are described in the dependent claims.

The cutting mechanism according to the invention is designed or configured or provided for a lawnmower, in particular a robotic lawn mower, and/or for a motor scythe. The cutting mechanism comprises or has at least one tool device, a tool connecting device, in particular only one tool connecting device, in particular only a single tool connecting device, and a securing device, in particular only one securing device, in particular only a single securing device. The tool device is designed or configured for cutting grass. The tool connecting device is designed or configured for rotation or rotational movement or rotary movement, in particular immediate or direct rotation or rotational movement or rotary movement, around a cutting mechanism rotation axis, in particular a central cutting mechanism rotation axis, of the cutting mechanism. Furthermore, the tool connecting device and the tool device are designed or configured to form a positive connection, in particular a releasable positive connection, to one another, in particular a positive connection which can be released without tools and/or without destruction, in particular to form said connection immediately or directly, in order to secure the tool device, in particular immediately or directly and/or positively, which, in particular then, is positively connected, against release from the tool connecting device radially in a radial direction, in particular and thus orthogonally, with respect to the cutting mechanism rotation axis. The securing device and the tool connecting device are designed or configured to be at least partially adjustable, in particular adjustably movable, in particular by a user, relative to one another in or counter to an at least partial, in particular exclusively, radial direction, at least section-by-section, between an enable position for enabling, in particular immediately or directly enabling, the production and/or release, in particular immediate or direct production or release, of the positive connection, in particular by the user, and a securing position for securing, in particular immediately or directly and/or positively securing, the positive connection against release, in particular and back again.

This enable position, in particular the enable position, makes it possible, in particular for the user, to change the tool device, in particular without tools and/or without destruction, or exchange the tool device, in particular without tools and/or without destruction. In addition this makes it possible, in particular the adjustability or adjustment in or counter to a radial direction makes it possible, for the adjustment to be independent of the rotation, in particular makes it possible to ensure that the adjustment from the securing position into the enable position cannot be brought about by rotation without the user or accidentally. Thus, this makes possible a high degree of safety.

In particular, the cutting mechanism can be designed for rotation, in particular immediate or direct rotation, around the cutting mechanism rotation axis.

The tool device, the tool connecting device and the securing device may be different.

The tool device may project beyond an edge of the tool connecting device and/or of the securing device which is on the outside in a radial direction, in particular beyond a respective edge which is on the outside in a radial direction, during, in particular owing to, rotation of the tool connecting device around the cutting mechanism rotation axis. In addition or as an alternative, the tool device can have, in particular can be, a cutting knife device, in particular a cutting knife, in particular having at least one cutting blade. As a further addition or alternative, the tool device can be designed to cut grass in the "free-cutting process" without a counter tool device, in particular a counter cutting edge. As a further addition or alternative, the tool device can be a tool element. As a further addition or alternative, the tool device can be integral.

The tool connecting device can be a tool connecting element. In addition or as an alternative, the tool connecting device can be integral.

The securing device can be a securing element. In addition or as an alternative, the securing device can be integral. As a further addition or alternative, the securing device can be designed for rotation, in particular immediate or direct rotation, around the cutting mechanism rotation axis.

The cutting mechanism can have a shaft receptacle, in particular the tool connecting device can have a first shaft receptacle, and/or the securing device can have a second shaft receptacle, for receiving a rotation shaft, in particular in an axial direction non-orthogonal, in particular parallel, with respect to the cutting mechanism rotation axis. The shaft receptacle, in particular the first shaft receptacle and/or the second shaft receptacle, can define the cutting mechanism rotation axis. In addition or as an alternative, the cutting mechanism rotation axis can be a cutting mechanism longitudinal axis of the cutting mechanism. As a further addition or alternative, "non-orthogonal" can signify a deviation, in particular an angular deviation, with respect to the cutting mechanism rotation axis of a maximum of 30 degrees (°), in particular a maximum of 20°, in particular a maximum of 10°.

The enable position and the securing position may be different.

The positive connection need not or may not be produced by the adjustment from the enable position to the securing position. In addition or as an alternative, the positive connection need not or may not be released by the adjustment from the securing position to the enable position. In other words: the tool connecting device and the tool device can be designed to form the positive connection to one another at least in the securing position, in particular and in the enable position.

The tool connecting device and the tool device can be designed to form a positive connection, in particular the and/or releasable positive connection, release being possible, in particular, without tools and/or without destruction, in order to secure, in particular immediately or directly and/or positively secure, the positively connected tool device against release from the tool connecting device counter to a radial direction and/or in and/or counter to a direction of rotation around the cutting mechanism rotation axis.

The radial direction can be orthogonal to a, in particular the, direction of rotation around the cutting mechanism rotation axis.

The securing device and the tool connecting device must or can be designed in such a way as to be at least partially, in particular completely, non-adjustable relative to one another in or counter to a, in particular the, direction of rotation around the cutting mechanism rotation axis and/or rotationally between the enable position and the securing position. In addition or as an alternative, the securing device and the tool connecting device can be designed to be at least partially adjustable in translation relative to one another between the enable position and the securing position.

An at least partial radial direction can signify a deviation, in particular an angular deviation, with respect to the radial direction of a maximum of 45°, in particular a maximum of 30°, in particular a maximum of 15°.

In a development of the invention, the tool device or the tool connecting device comprises or has a pin or a bolt or a peg. The tool connecting device or the tool device comprises or has a pin receptacle. The pin and the pin receptacle are designed or configured to receive the pin, in particular parallel to a pin longitudinal axis of the pin, to form the positive connection. In particular, the pin longitudinal axis is non-orthogonal, in particular parallel, with respect to the cutting mechanism rotation axis. This allows simple production of the positive connection and/or rotation of the tool device around the pin longitudinal axis. In particular, the pin receptacle can be a hole, in particular a through-hole. In addition or as an alternative, the pin longitudinal axis can be decentralized, and/or the pin longitudinal axis must or can be non-coaxial with respect to the cutting mechanism rotation axis. As a further addition or alternative, "non-orthogonal" can signify a deviation, in particular an angular deviation, with respect to the cutting mechanism rotation axis of a maximum of 30°, in particular a maximum of 20°, in particular a maximum of 10°. As a further addition or alternative, the pin longitudinal axis must or can be non-parallel, in particular orthogonal, with respect to the radial direction. In particular, "non-parallel" can signify a deviation, in particular an angular deviation, with respect to the radial direction of a minimum of 60°, in particular a minimum of 70°, in particular a minimum of 80°. As a further addition or alternative, the tool device can extend away from the pin longitudinal axis in a radial direction at least during, in particular owing to, rotation of the tool connecting device around the cutting mechanism rotation axis.

In a development of the invention, the tool connecting device and the tool device are designed or configured to form a positive connection, in particular a further and/or releasable positive connection, to one another, in particular a positive connection which can be released without tools and/or without destruction, in particular to form said connection immediately or directly, at least in the securing position, in particular and in the enable position, in order to secure the tool device, in particular immediately or directly and/or positively, which, in particular then, is positively connected, against release from the tool connecting device radially in a, in particular the, first axial direction non-orthogonal, in particular parallel, with respect to the cutting mechanism rotation axis.

In addition or as an alternative, the securing device and the tool device are designed or configured to form a positive connection, in particular a releasable positive connection, to one another, in particular a positive connection which can be released without tools and/or without destruction, in particular to form said connection immediately or directly, in the securing position, in particular only in the securing position, in order to secure the tool device, in particular immediately or directly and/or positively, which, in particular then, is positively connected, against release from the securing device, in a second axial direction, in particular the second axial direction and/or the axial direction counter to the first axial direction, said second axial direction being non-orthogonal, in particular parallel, with respect to the cutting mechanism rotation axis.

As a further addition or alternative, the securing device and the tool connecting device are designed or configured to form a positive connection, in particular a releasable connection, to one another, in particular a positive connection which can be released without tools and/or without destruction, in particular to form said connection immediately or directly, in the securing position, in particular only in the securing position, in order to secure them, in particular immediately or directly and/or positively, against release from one another in an axial direction, in particular at least one axial direction, in particular the first and/or the second axial direction, non-orthogonal, in particular parallel, with respect to the cutting mechanism rotation axis.

In particular, "non-orthogonal" can signify a deviation, in particular an angular deviation, with respect to the cutting mechanism rotation axis of a maximum of 30°, in particular a maximum of 20°, in particular a maximum of 10°. In addition or as an alternative, the axial direction, in particular the first or second axial direction, must or can be non-parallel, in particular orthogonal, with respect to the radial direction. In particular, "non-parallel" can signify a deviation, in particular an angular deviation, with respect to the radial direction of a minimum of 60°, in particular a minimum of 70°, in particular a minimum of 80°. As a further addition or alternative, the positive connection of the securing device and of the tool device to one another and/or of the securing device and of the tool connecting device to one another can be produced by the adjustment from the enable position to the securing position. As a further addition or alternative, the positive connection of the securing device and of the tool device to one another and/or of the securing device and of the tool connecting device to one another can be released by the adjustment from the securing position to the enable position. In other words: The securing device and the tool device and/or the securing device and the tool connecting device need not or may not be designed to form the positive connection to one another in the enable position. As a further addition or alternative, the positive connection of the securing device and of the tool device to one another and/or of the securing device and of the tool connecting device to one another in order to secure the positive connection of the tool connecting device and of the tool device to one another can be designed to secure, in particular do secure, and/or bring about securing of the positively connected tool device against release from the tool connecting device in a radial direction. As a further addition or alternative, the positive connection of the securing device and of the tool connecting device to one another in a half, in particular a respective half, which is on the outside in a radial direction can be, in particular can be arranged, in particular on an edge, in particular a respective edge, which is on the outside in a radial direction, of the securing device and/or of the tool connecting device. This can enable avoidance or even prevention of levering or bending up at the outside. As a further addition or alternative, the positive connection of the securing device and of the tool connecting device to one another can be, in particular can be arranged, in the vicinity, in particular on, the tool device.

In a development, in particular an embodiment, of the invention, the tool connecting device or the securing device, in particular either the tool connecting device or the securing device, comprises or has a cover disc or plate, in particular only one, in particular only a single and/or circular cover disc or plate. The cover disc is designed or configured for, in particular immediate or direct, rotation or rotational movement or rotary movement around the cutting mechanism rotation axis, and to cover the positive connection, in particular the further positive connection, of the tool connecting device and of the tool device to one another, where provided, and/or of the securing device and of the tool device to one another, where provided, in an axial direction, in particular the axial direction non-orthogonal, in particular parallel, with respect to the cutting mechanism rotation axis. This allows protection of the positive connection before contact with or touching of grass and/or turf or a lawn. In particular, the cover disc can be referred to as a sliding disc. In addition or as an alternative, "non-orthogonal" can signify a deviation, in particular an angular deviation, with respect to the cutting mechanism rotation axis of a maximum of 30°, in particular a maximum of 20°, in particular a maximum of 10°. As a further addition or alternative, the axial direction must or can be non-parallel, in particular orthogonal, with respect to the radial direction. In particular, "non-parallel" can signify a deviation, in particular an angular deviation, with respect to the radial direction of a minimum of 60°, in particular a minimum of 70°, in particular a minimum of 80°.

In a development of the invention, the securing device and the tool connecting device are designed or configured to be at least partially adjustable relative to one another in an, in particular the, axial direction non-orthogonal, in particular parallel, with respect to the cutting mechanism rotation axis, section-by-section between the enable position and the securing position. In particular, the securing device and the tool connecting device are designed or configured to be at least partially adjustable relative to one another in the axial direction, in particular only in the axial direction, in a first adjusting section or adjusting movement section between the enable position and an intermediate position, and in or counter to a radial direction, in particular only in or counter to a radial direction, in a second adjusting section or adjusting movement section, in particular a section different from the first adjusting section, between the intermediate position and the securing position. This allows particularly high security against accidental adjustment from the securing position to the enable position. In particular, the intermediate position can be different from the securing position and the enable position. In addition or as an alternative, the positive connection of the securing device and of the tool device to one another, where provided, can be produced by the adjustment from the enable position to the intermediate position. As a further addition or alternative, the positive connection of the securing device and of the tool device to one another, where provided, can be released by the adjustment from the intermediate position to the enable position. As a further addition or alternative, the positive connection of the securing device and of the tool connecting device to one another, where provided, can be produced by the adjustment from the intermediate position to the securing position. As a further addition or alternative, the positive connection of the securing device and of the tool connecting device to one another, where provided, can be released by the adjustment from the securing position to the intermediate position. As a further addition or alternative, "non-orthogonal" can signify a deviation, in particular an angular deviation, with respect to the cutting mechanism rotation axis of a maximum of 30°, in particular a maximum of 20°, in particular a maximum of 10°. As a further addition or alternative, the axial direction must or can be non-parallel, in particular orthogonal, with respect to the radial direction. In particular, "non-parallel" can signify a deviation, in particular an angular deviation, with respect to the radial direction of a minimum of 60°, in particular a minimum of 70°, in particular a minimum of 80°.

In a development of the invention, the cutting mechanism comprises or has a plurality of tool devices. The tool devices are designed or configured, in particular each designed or configured, for cutting grass. The tool connecting device and the tool devices are designed or configured, in particular are each designed or configured, to form positive connections, in particular releasable positive connections, to one another, in particular positive connections which can be released without tools and/or without destruction, in particular to form said connection immediately or directly, in order to secure the tool devices, in particular immediately or directly and/or positively, which, in particular then, are positively connected, against release from the tool connecting device radially in different, in particular respective, radial directions, in particular and thus orthogonally, with respect to the cutting mechanism rotation axis. The securing device and the tool connecting device are designed or configured to be at least partially adjustable relative to one another between the enable position for enabling, in particular immediately or directly enabling, the production and/or release, in particular immediate or direct production and/or release, of the positive connections, and the securing position for securing, in particular immediately or directly and/or positively securing, the positive connections against release. This allows the positive connections to be produced easily. In particular, the tool devices can be of identical construction. In addition or as an alternative, the positively connected tool devices can be arranged in a, in particular the, direction of rotation around the cutting mechanism rotation axis, in particular in a regular manner, in particular equidistantly. The radial directions can be orthogonal to a, in particular the, direction of rotation around the cutting mechanism rotation axis.

In one embodiment of the invention, the securing device and the tool connecting device are designed or configured to be fully adjustable relative to one another in or counter to only a single radial direction, at least section-by-section, between the enable position and the securing position.

This allows simple adjustment and/or simple and thus low-cost production of the cutting mechanism, in particular of the securing device and/or of the tool connecting device.

As an alternative, the securing device and the tool connecting device are designed or configured to be adjustable with a plurality of parts relative to one another in or counter to different radial directions, at least section-by-section, between the enable position and the securing position.

This allows a symmetry, in particular a rotational symmetry, of the cutting mechanism, in particular of the securing device and/or of the tool connecting device, in a, in particular the, direction of rotation around the cutting mechanism rotation axis. This allows simple and thus low-cost production of the cutting mechanism, in particular of the securing device and/or of the tool connecting device.

In a development, in particular embodiment, of the invention, the securing device or the tool connecting device, in particular either the securing device or the tool connecting device, are designed or configured for changing at least one dimension, in particular its dimension, or an extent, in particular its extent, in particular a radius, in particular its radius, in a radial direction, in particular in different radial directions, where provided, for adjustment, at least section-by-section, between the enable position and the securing position. In particular, the dimension can be small in the enable position, in particular and in the intermediate position, where provided, and large in the securing position. This can allow particularly high security against accidental adjustment from the securing position to the enable position.

In one embodiment of the invention, the securing device or the tool connecting device, in particular either the securing device or the tool connecting device, comprises or has an axial part and at least one radial part movably connected to the axial part, in particular directly or indirectly. In this case, the axial part is designed or configured to be adjustable, in particular adjustably movable, in, in particular only, one, in particular the, axial direction non-orthogonal, in particular parallel, with respect to the cutting mechanism rotation axis, and the radial part is designed or configured to be adjustable, in particular adjustably movable in an at least partial radial direction, in particular being adjustable, in particular adjustably movable, relative to one another, to change the dimension. In particular, the axial part and the radial part can be different. In addition or as an alternative, "non-orthogonal" can signify a deviation, in particular an angular deviation, with respect to the cutting mechanism rotation axis of a maximum of 30°, in particular a maximum of 20°, in particular a maximum of 10°. As a further addition or alternative, the axial direction must or can be non-parallel, in particular orthogonal, with respect to the radial direction. In particular, "non-parallel" can signify a deviation, in particular an angular deviation, with respect to the radial direction of a minimum of 60°, in particular a minimum of 70°, in particular a minimum of 80°. As a further addition or alternative, the radial part can be designed to be adjustable only in a radial direction. This can allow a relatively large change in the dimension. As a further addition or alternative, the axial part can be, in particular can be arranged, on or as an extension of the cutting mechanism rotation axis. As a further addition or alternative, the radial part can be, in particular can be arranged, towards the outside in a radial direction from the cutting mechanism rotation axis and/or the axial part. As a further addition or alternative, the axial part and the radial part can be designed for adjustment of the radial part by adjustment of the axial part.

In a development, in particular embodiment, of the invention, the securing device or the tool connecting device, in particular either the securing device or the tool connecting device, comprises or has at least one rotatable joint, in particular a rotary joint, or a hinge, for adjustment at least section-by-section between the enable position and the securing position. In particular, the axial part and the radial part, where provided, are connected in an adjustably movable manner by means of the at least one joint to change the dimension. In particular, the joint can be a film hinge. This can allow simple and thus low-cost production of the cutting mechanism, in particular of the securing device or of the tool connecting device. In addition or as an alternative, the joint can have a joint pin. This can enable the adjustment to be relatively wear-free and/or relatively smooth. As a further addition or alternative, the securing device or the tool connecting device can have two rotatable joints per radial part, in particular mechanically connected by means of an intermediate part, or can have a joint capable of multiple, in particular double rotation, in particular a multiple swivel joint, in particular a double swivel joint. This can allow the adjustment of the radial part only in a radial direction. As a further addition or alternative, the at least one joint can be designed for adjustment of the radial part by adjustment of the axial part. As a further addition or alternative, a joint longitudinal axis of the joint can be non-orthogonal, in particular parallel, with respect to a, in particular the, direction of rotation around the cutting mechanism rotation axis. In particular, "non-orthogonal" can signify a deviation, in particular an angular deviation, with respect to the rotation direction of a maximum of 30°, in particular a maximum of 20°, in particular a maximum of 10°.

In a development, in particular an embodiment, of the invention, the tool connecting device and/or the securing device, in particular the cover disc and/or the axial part, where provided, extend/extends away from the cutting mechanism rotation axis in a radial direction, in particular immediately or directly, in particular in the securing position.

In addition or as an alternative, the tool connecting device and/or the securing device, in particular the cover disc and/or the axial part, where provided, completely surround/surrounds the cutting mechanism rotation axis in a, in particular the, direction of rotation around the cutting mechanism rotation axis, at least in the securing position.

In a development of the invention, the tool connecting device comprises or has a, in particular the, first shaft receptacle for receiving a, in particular the, rotation shaft, in particular in an, in particular the, axial direction non-orthogonal, in particular parallel, with respect to the cutting mechanism rotation axis. The securing device comprises or has a, in particular the, second shaft receptacle for receiving the, in particular the same, rotation shaft, in particular in the axial direction. The first shaft receptacle and the second shaft receptacle are designed or configured to be adjustable, in particular adjustably movable, relative to one another, in particular in or counter to a radial direction and/or in or counter to the axial direction, at least section-by-section, between the enable position and the securing position. This allows securing, in particular positive securing, against adjustment of the first shaft receptacle and of the second shaft receptacle in the securing position by the rotation shaft, in particular the received rotation shaft, and/or a fastening element for fastening the cutting mechanism in the securing position on the rotation shaft into the enable position, in particular and the intermediate position, where provided. In particular, the first shaft receptacle and the second shaft receptacle can be non-coaxial with respect to the cutting mechanism rotation axis in the enable position, in particular and the intermediate position, where provided. In addition or as an alternative, "non-orthogonal" can signify a deviation, in particular an angular deviation, with respect to the cutting mechanism rotation axis of a maximum of 30°, in particular a maximum of 20°, in particular a maximum of 10°. As a further addition or alternative, the axial direction must or can be non-parallel, in particular orthogonal, with respect to the radial direction. In particular, "non-parallel" can signify a deviation, in particular an angular deviation, with respect to the radial direction of a minimum of 60°, in particular a minimum of 70°, in particular a minimum of 80°.

The lawnmower according to the invention and/or the motor scythe according to the invention comprise/comprises or have/has, in particular each comprise or have, a, in particular the, cutting mechanism as described above. In particular, the lawnmower can be a robotic lawn mowing robot, in particular an autonomous mobile robotic lawn mowing robot. In addition or as alternatives, the motor scythe can be referred to as a brush cutter, grass trimmer and/or lawn trimmer. As a further addition or alternative, the lawnmower and/or the motor scythe can, in particular can each, have a drive motor, in particular an electric drive motor, for driving the tool connecting device, in particular the cutting mechanism, in rotation around the cutting mechanism rotation axis.

In a development of the invention, the lawnmower and/or the motor scythe comprise/comprises or have/has, in particular each comprise or have, a, in particular the, rotation shaft or hub or drive shaft, and a, in particular the, fastening element. The rotation shaft and the cutting mechanism, in particular as described above, are designed or configured for the fastening, in particular releasable fastening, in particular fastening in a manner that allows release without tools and/or destruction, of the cutting mechanism on the rotation shaft in the securing position, in particular only in the securing position, by means of the fastening element, in particular for the reception of the rotation shaft, where provided. The rotation shaft, in particular the rotation shaft which has then been received, and/or the fastening element and the fastened cutting mechanism are designed or configured for securing, in particular immediately or directly and/or positively securing, against adjustment, in particular relative adjustment, in particular of the first shaft receptacle and of the second shaft receptacle, in particular relative to one another, where provided, into the enable position, in particular and the intermediate position, where provided. In particular, the rotation shaft can be designed for rotation, in particular immediate or direct rotation, around the cutting mechanism rotation axis. In particular, the lawnmower and/or the motor scythe can, in particular can each, have a drive motor, in particular the and/or electric drive motor, for driving the rotation shaft in rotation around the cutting mechanism rotation axis.

The method according to the invention is designed or configured or provided for assembling a, in particular the, cutting mechanism as described above, and/or a, in particular the, lawnmower and/or a, in particular the, motor scythe as described above. The method comprises or has the following steps: a) Producing the positive connection of the tool connecting device and of the tool device to one another, in particular by the user. b) Adjusting the securing device and the tool connecting device at least partially relative to one another between the enable position and the securing position, in particular by the user. In particular, step b) may be carried out at a later time than step a).

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a lawnmower according to the invention and a motor scythe according to the invention, each having a cutting mechanism according to the invention and a method according to the invention;

FIG. 2 shows a perspective view of a first exemplary embodiment of a cutting mechanism according to the invention in a securing position, and the method;

DETAILED DESCRIPTION OF THE DRAWINGS

Figure 7:
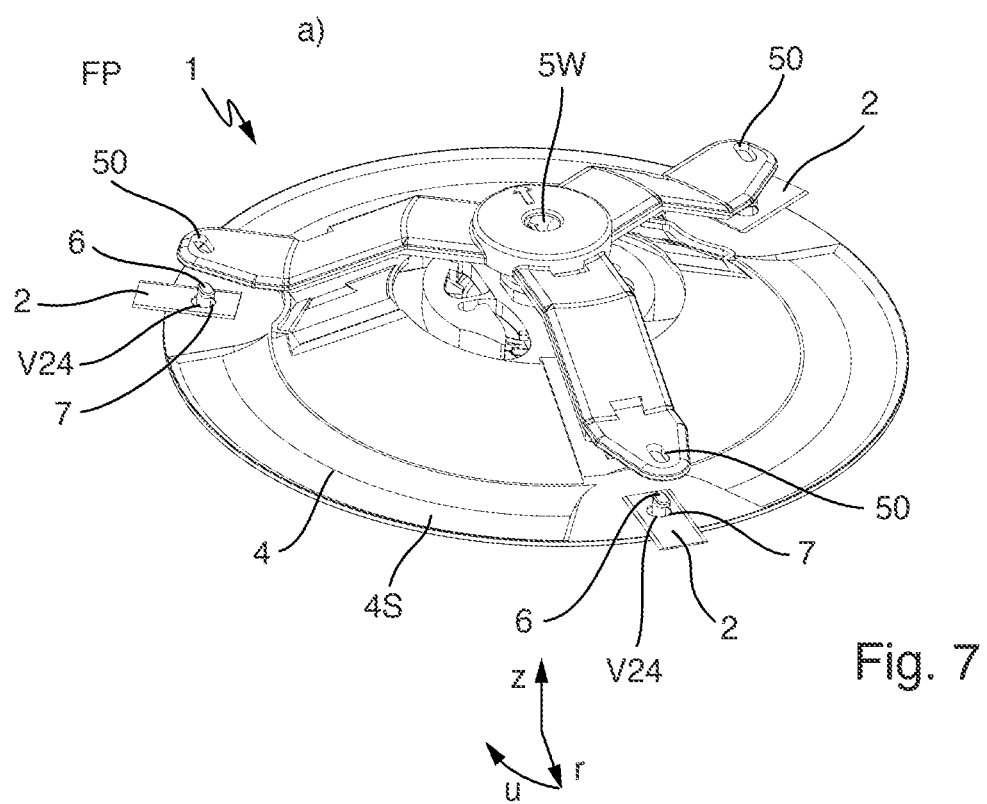
FIG. 7 shows a perspective view of the cutting mechanism of FIG. 2 in an enable position, and the method.
Figure 8:
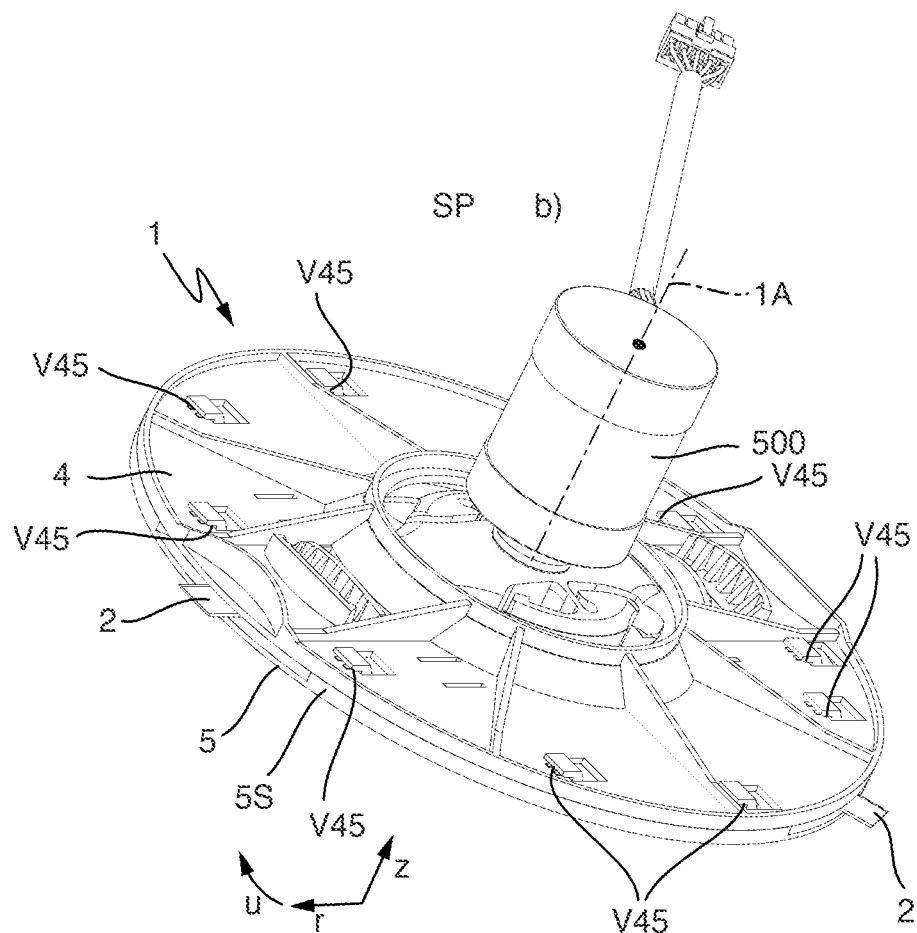
FIG. 8 shows a perspective view of a second exemplary embodiment of a cutting mechanism according to the invention in a securing position, and the method.
Figure 12:
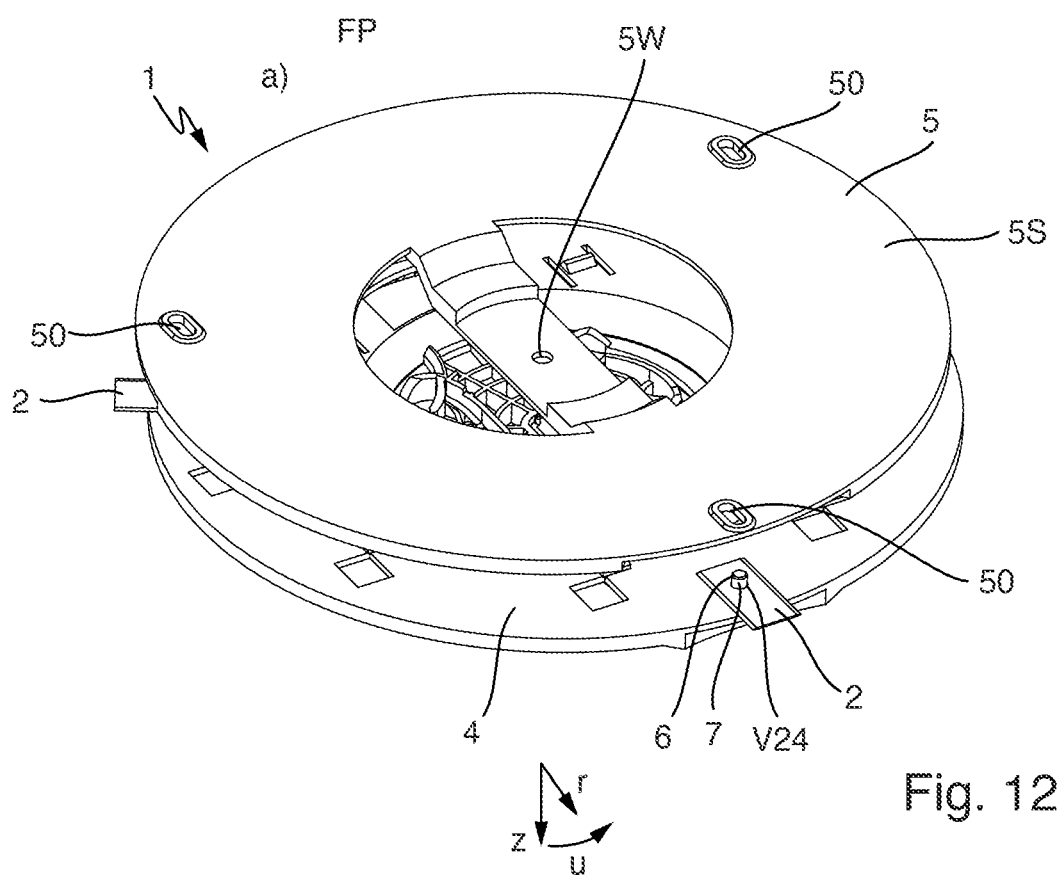
FIG. 12 shows a perspective view of the cutting mechanism of FIG. 8 in an enable position, and the method.
Figure 13:
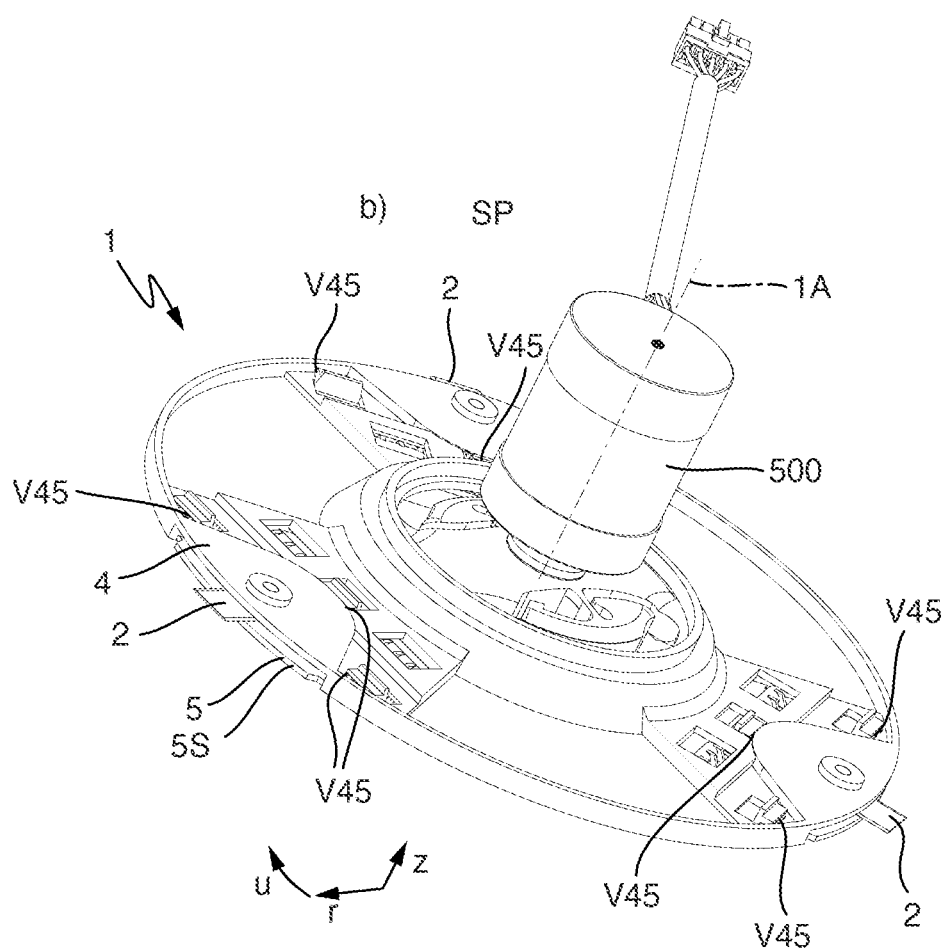
FIG. 13 shows a perspective view of a third exemplary embodiment of a cutting mechanism according to the invention in a securing position, and the method.
Figure 19:
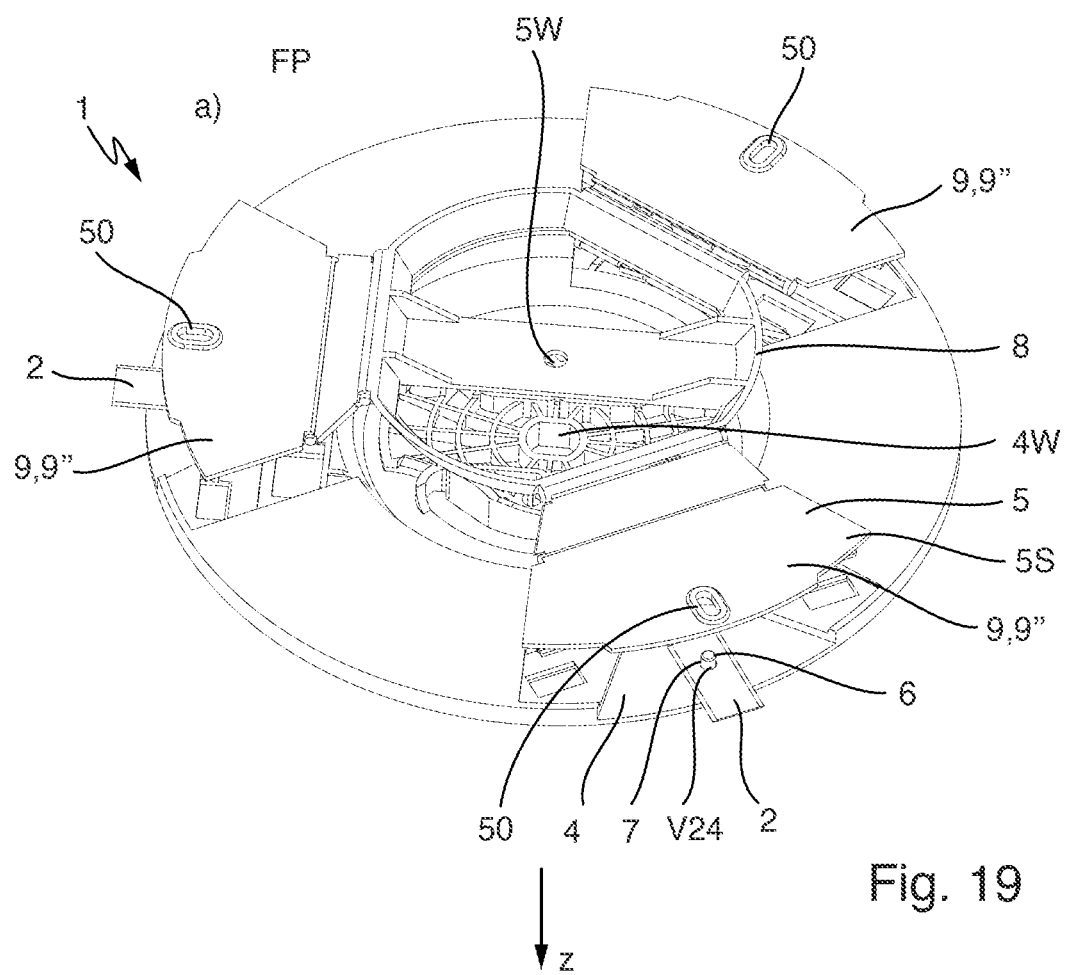
FIG. 19 shows a perspective view of the cutting mechanism of FIG. 13 in an enable position, and the method.

FIGS. 1, 2 to 7, 8 to 12 and 13 to 19 show, in particular each show, a cutting mechanism 1 for a lawnmower 100 and/or a motor scythe 200. The cutting mechanism 1 has at least one tool device 2, a tool connecting device 4 and a securing device 5. The tool device 2 is designed to cut, in particular cuts, grass 300, as shown in FIG. 1. As shown in FIG. 1, the tool connecting device 4 is designed for rotation, in particular rotates, around a cutting mechanism rotation axis 1A of the cutting mechanism 1, said rotation axis being approximately vertical in a correct operating alignment in the exemplary embodiments shown. As shown in FIGS. 4, 6, 7, 9, 11, 12, 14, 18 and 19, the tool connecting device 4 and the tool device 2 are furthermore designed to form a positive connection V24 to one another, in particular are positively connected, in order to secure the positively connected tool device 2 against release from the tool connecting device 4 radially in a radial direction r with respect to the cutting mechanism rotation axis 1A, said radial direction being approximately horizontal in the correct operating alignment in the exemplary embodiments shown. The securing device 5 and the tool connecting device 4 are designed to be at least partially adjustable relative to one another in or counter to an at least partial radial direction r, in the exemplary embodiments shown only in said radial direction, at least section-by-section between an enable position FP for enabling the production and/or release of the positive connection V24 and a securing position SP for securing, in particular positively securing, the positive connection V24 against release, in particular are adjusted into the enable position FP, as shown in FIGS. 7, 12 and 19, or into the securing position SP, as shown in FIGS. 2 to 4, 8, 9 and 13 to 15.

In particular, "approximately vertical" can signify a deviation, in particular an angular deviation, with respect to a, in particular the, vertical of a maximum of 10°, in particular a maximum of 5°, in particular 3°. In addition or as an alternative, "approximately horizontal" can signify a deviation, in particular an angular deviation, with respect to a, in particular the, horizontal of a maximum of 10°, in particular a maximum of 5°, in particular 3°.

FIG. 1 shows a lawnmower 100, in particular in the form of a robotic lawnmower, and the motor scythe 200. The lawnmower 100 and the motor scythe 200 have, in particular each have, such a cutting mechanism 1 as described above.

FIGS. 1, 2 to 7, 8 to 12 and 13 to 19 show, in particular each show, a method for assembling the cutting mechanism 1 as described above and/or the lawnmower 100 and the motor scythe 200 as described above. The method has the following steps: a) Producing the positive connection V24 of the tool connecting device 4 and of the tool device 2 to one another, as shown in FIGS. 7, 12 and 19. b) Adjusting the securing device 5 and the tool connecting device 4 at least partially relative to one another between the enable position FP and the securing position SP, as shown in FIGS. 1, 2 to 6, 8 to 11 and 13 to 18.

In the exemplary embodiments shown, the cutting mechanism 1 is designed for rotation, in particular rotates, around the cutting mechanism rotation axis 1A, as shown in FIG. 1.

Furthermore, the lawnmower 100 and the motor scythe 200 have, in particular each have, a drive motor 500 for driving the tool connecting device 4, in particular the cutting mechanism 1, in rotation around the cutting mechanism rotation axis 1A, as shown in FIGS. 1, 2, 4, 8, 9, 13, 14.

Moreover, the tool connecting device 4 and the tool device 2 are designed to form the positive connection V24 to one another, in particular are positively connected, in order to secure the positively connected tool device 2 against release from the tool connecting device counter to the radial direction −r and/or in and/or counter to a direction of rotation u around the cutting mechanism rotation axis 1A, said direction of rotation being approximately horizontal in the correct operating alignment in the exemplary embodiments shown.

In detail, the cutting mechanism 1 has a plurality of tool devices 2. The tool devices 2 are designed to cut, in particular do cut, grass 300. The tool connecting device 4 and the tool devices 2 are furthermore designed to form positive connections V24 to one another, in particular are positively connected, in order to secure the positively connected tool devices 2 against release from the tool connecting device radially in different radial directions r with respect to the cutting mechanism rotation axis 1A, said radial directions being approximately horizontal in the correct operating alignment in the exemplary embodiments shown. The securing device 5 and the tool connecting device 4 are designed to be at least partially adjustable relative to one another between the enable position FP for enabling the production and/or release of the positive connections V24 and the securing position SP for securing, in particular positively securing, the positive connections V24 against release, in particular are adjusted into the enable position FP or into the securing position SP.

In the exemplary embodiments shown, the cutting mechanism 1 has three tool devices 2. In alternative exemplary embodiments, the cutting mechanism can have just a single tool device, two tool devices or at least four tool devices.

In the exemplary embodiments shown, the, in particular three, positively connected tool devices 2 are furthermore arranged in the direction of rotation u around the cutting mechanism rotation axis 1A, in particular in a regular manner, in particular equidistantly, in particular at equidistant 120° intervals.

In the exemplary embodiments shown, the, in particular three, different radial directions r are regular, in particular equidistant, in particular at equidistant 120° intervals, with respect to one another, in particular around the cutting mechanism rotation axis 1A, in particular in a manner corresponding to the arrangement of the tool devices 2.

In the exemplary embodiments shown, the tool connecting device 4 furthermore has a pin 6, in particular a plurality of the tool devices 2 has a corresponding plurality of pins 6. The tool device 2 has, in particular the tool devices 2 each have, a pin receptacle 7, in particular in the form of a through-hole. The, in particular the respective, pin 6, and the, in particular the respective, pin receptacle 7, are designed to receive the pin 6, in particular are received, in particular parallel to a pin longitudinal axis 6A of the pin 6, said axis being approximately vertical in the correct operating alignment in the exemplary embodiments, for, in particular for respective, positive connection V24. In particular, the pin longitudinal axis 6A is non-orthogonal, in particular parallel, with respect to the cutting mechanism rotation axis 1A.

In alternative exemplary embodiments, the tool device can, in particular the tool devices can each, have a pin, and the tool connecting device can have a pin receptacle, in particular a plurality of the tool devices can have a corresponding plurality of pin receptacles.

In the exemplary embodiments shown, the securing device 5 furthermore has a securing pin receptacle 50, in particular a plurality of the tool devices 2 has a corresponding plurality of securing pin receptacles 50, in particular in the form of a through-hole, in particular a respective through-hole. The pin 6, in particular the respective pin, and the securing pin receptacle 50, in particular the respective securing pin receptacle, are designed to receive the pin 6, in particular parallel to the pin longitudinal axis 6A of the pin 6, being received at least in the securing position SP in the exemplary embodiments shown, and not in the enable position FP in the exemplary embodiments shown. In particular, the securing pin receptacle 50 extends in an at least partial radial direction r, only in said radial direction in the exemplary embodiment shown in FIGS. 13 to 19, for adjustment at least section-by-section between the enable position FP and the securing position SP.

In detail, the tool connecting device 4 and the, in particular the respective, tool device 2 are designed to form a positive, in particular further positive, and/or respective positive, connection V24' to one another, in particular are connected positively, at least in the securing position SP, and in the enable position FP in the exemplary embodiments shown, in order to secure the positively connected tool device 2 against release from the tool connecting device 4 in a first axial direction z, −z non-orthogonal, in particular parallel, with respect to the cutting mechanism rotation axis 1A, said direction being approximately vertical in the correct operating alignment in the exemplary embodiments shown, as shown in FIGS. 2 to 7, 8 to 12 and 13 to 19.

In the exemplary embodiment shown in FIGS. 2 to 7, the first axial direction is −z or downwards in the correct operating alignment. In the exemplary embodiments shown in FIGS. 8 to 12 and 13 to 19, the first axial direction is z or upwards in the correct operating alignment.

In addition, the securing device 5 and the, in particular the respective, tool device 2 are designed to form a positive, in particular a respective positive, connection V25 to one another, in particular are connected positively, at least in the securing position SP in the exemplary embodiments shown, and not in the enable position FP in the exemplary embodiments shown, in order to secure the positively connected tool device 2 against release from the securing device 5 in a second axial direction −z, z non-orthogonal, in particular parallel, with respect to the cutting mechanism rotation axis 1A, in particular a second axial direction counter to the first axial direction z, −z, said direction being approximately vertical in the correct operating alignment in the exemplary embodiments shown, as shown in FIGS. 2 to 6, 8 to 11 and 13 to 18.

In the exemplary embodiment shown in FIGS. 2 to 7, the second axial direction is z or upwards in the correct operating alignment. In the exemplary embodiments shown in FIGS. 8 to 12 and 13 to 19, the second axial direction is −z or downwards in the correct operating alignment.

As a further addition, the securing device 5 and the tool connecting device 4 are designed to form a positive connection V45, in particular a plurality of positive connections V45, to one another, in particular are connected positively, in the securing position SP, only in the securing position SP in the exemplary embodiments shown, in order to secure against release from one another in an, in particular at least one, axial direction −z, z non-orthogonal, in particular parallel, with respect to the cutting mechanism rotation axis 1A, in particular an axial direction opposite to the first and/or the second axial direction z, −z, said direction being approximately vertical in the correct operating alignment in the exemplary embodiments shown, as shown in FIGS. 2 to 4, 8 and 9 and 13 to 15.

In the exemplary embodiment shown in FIGS. 2 to 7, the securing device 5 is arranged above the tool connecting device 4 in the correct operating alignment, in particular the arrangement being as follows from the bottom up in the correct operating alignment: tool connecting device 4, tool device 2, securing device 5. In the exemplary embodiments shown in FIGS. 8 to 12 and 13 to 19, the securing device 5 is arranged below the tool connecting device 4 in the correct operating alignment, in particular the spatial arrangement being as follows from the bottom up in the correct operating alignment: securing device 5, tool device 2, tool connecting device 4.

In the exemplary embodiments shown, the, in particular the respective, positive connection V45 of the securing device 5 and of the tool connecting device 4 to one another is furthermore in the form of a latching connection, in particular by means of a latching hook, in particular a respective latching hook.

In particular, the, in particular the respective, pin 6 has the, in particular the respective, latching hook in the exemplary embodiment shown in FIGS. 2 to 7.

Furthermore, ten latching hooks are provided in the exemplary embodiment shown in FIGS. 8 to 12.

Moreover, nine latching hooks are provided in the exemplary embodiment shown in FIGS. 8 to 12.

In the exemplary embodiment shown in FIGS. 2 to 7, the tool connecting device 4 furthermore has a cover disc 4S, in particular a circular cover disc. In the exemplary embodiments shown in FIGS. 8 to 12 and 13 to 19, the securing device 5 has a cover disc 5S, in particular a circular cover disc. The cover disc 4S, 5S is designed for rotation around the cutting mechanism rotation axis 1A and for covering the, in particular the further, positive connection V24, V24', V25 of the tool connecting device 4 and of the tool device 2 to one another and/or of the securing device 5 and of the tool device 2 to one another, in particular rotates and covers said positive connection, in the axial direction z non-orthogonal, in particular parallel, with respect to the cutting mechanism rotation axis 1A, in particular upwards in the correct operating alignment.

Moreover, the securing device 5 and the tool connecting device 4 are designed to be at least partially adjustable relative to one another in the axial direction z, −z non-orthogonal, in particular parallel, with respect to the cutting mechanism rotation axis 1A, section-by-section between the enable position FP and the securing position SP, in particular are adjusted into the enable position FP or into the securing position SP. In particular, the securing device 5 and the tool connecting device 4 are designed to be at least partially adjustable relative to one another in, in the exemplary embodiments shown only in, the axial direction z, −z in a first adjusting section between the enable position FP and an intermediate position ZP, and in or counter to, in the exemplary embodiments shown only in or counter to, a radial direction r, −r in a second adjusting section, in particular a second adjusting section different from the first adjusting section, between the intermediate position ZP and the securing position SP, in particular are adjusted into the enable position FP, as shown in FIGS. 7, 12 and 19, or into the intermediate position ZP, as shown in FIGS. 5, 6, 10, 11 and 16 to 18, or into the securing position SP, as shown in FIGS. 2 to 4, 8, 9 and 13 to 15.

In the exemplary embodiments shown, the positive connection V25 of the securing device 5 and of the tool device 2 to one another is produced by the adjustment from the enable position FP to the intermediate position ZP. In addition, the positive connection V45 of the securing device 5 and of the tool device 4 to one another is released by the adjustment from the intermediate position ZP to the enable position FP. As a further addition, the positive connection V45 of the securing device 5 and of the tool connecting device 4 to one another is produced by the adjustment from the intermediate position ZP to the securing position SP. As a further addition, the positive connection V45 of the securing device 5 and of the tool connecting device 4 to one another is released by the adjustment from the securing position SP to the intermediate position ZP.

In particular, the cutting mechanism 1 can be rotated onto its head in the exemplary embodiments shown in FIGS. 8 to 12 and 13 to 19. This makes it possible for the, in particular the respective, tool device 2 not to fall downwards during assembly and/or disassembly but to rest on the tool connecting device 4, in particular to remain thereon.

Particularly in that case, the securing device 5 can be lifted upwards from the tool connecting device 4, from the intermediate position ZP into the enable position FP. At a subsequent point in time, the, in particular the respective, tool device 2 can be lifted upwards from the tool connecting device 4, in particular from the, in particular the respective, pin 6.

In the exemplary embodiments shown in FIGS. 2 to 7 and 8 to 12, the securing device 5 and the tool connecting device 4 are furthermore designed to be fully adjustable, in particular are adjusted, relative to one another in or counter to only a single radial direction r, −r, at least section-by-section, between the enable position FP and the securing position SP, in particular between the intermediate position ZP and the securing position SP in the second adjusting section.

As an alternative, in the exemplary embodiment shown in FIGS. 13 to 19, the securing device 5 and the tool connecting device 4 are designed to be adjustable, in particular are adjusted, with a plurality of parts 9', in particular radial parts 9'', relative to one another in or counter to different radial directions r, −r, at least section-by-section, between the enable position FP and the securing position SP, in particular between the intermediate position ZP and the securing position SP in the second adjusting section.

In the exemplary embodiment shown in FIGS. 13 to 19, the securing device 5 is furthermore designed for changing at least one dimension AM, in particular a radius RA, in a radial direction r, in particular in different radial directions r, for adjustment, at least section-by-section, between the enable position FP and the securing position SP, in particular between the intermediate position ZP and the securing position SP in the second adjusting section, in particular the dimension AM is changed.

In alternative exemplary embodiments, the tool connecting device can be designed for changing at least one dimension, in particular a radius, in a radial direction, in particular in different radial directions, for adjustment, at least section-by-section, between the enable position and the securing position.

In the exemplary embodiment shown in FIGS. 13 to 19, the dimension AM is small in the enable position FP, in particular and in the intermediate position ZP, and is large in the securing position SP.

In detail, the securing device 5 in the exemplary embodiment shown in FIGS. 13 to 19 has an axial part 8 and the at least one radial part 9'' movably connected to the axial part 8. In this case, the axial part 8 is designed to be adjustable, in particular is adjusted, in the axial direction z non-orthogonal, in particular parallel, with respect to the cutting mechanism rotation axis 1A, in the exemplary embodiment shown only in said direction, and the radial part 9'' is designed to be adjustable, in particular is adjusted, at least in a, in particular a respective, partial radial direction r, in the exemplary embodiment shown only in said direction, to change the dimension AM.

In alternative exemplary embodiments, the tool connecting device can have an axial part and at least one radial part movably connected to the axial part.

In the exemplary embodiment shown in FIGS. 13 to 19, the securing device 5 has three radial parts 9''. In alternative exemplary embodiments, the securing device or the tool connecting device can have just a single radial part, two radial parts or at least four radial parts.

In the exemplary embodiments shown in FIGS. 13 to 19, the, in particular three, radial parts 9'' are furthermore arranged in the direction of rotation u around the cutting mechanism rotation axis 1A, in particular in a regular manner, in particular equidistantly, in particular at equidistant 120° intervals.

Moreover, the axial part 8 is, in particular is arranged, on or as an extension of the cutting mechanism rotation axis 1A.

In addition, the at least one radial part 9'' is, in particular is arranged, towards the outside of the cutting mechanism rotation axis 1A and/or the axial part 8 in a, in particular respective, radial direction r.

In particular, the at least one radial part 9'' has the securing pin receptacle 50.

Furthermore, the at least one radial part 9'' and the tool device 2 are designed to form the positive connection V25 to one another, in particular being positively connected.

Furthermore, the at least one radial part 9'' and the tool connecting device 4 are designed to form the positive connection V45 to one another, in particular being positively connected.

Furthermore, the at least one radial part 9'' has the cover disc 5S, in particular the at least one radial part 9'' is the cover disc 5S.

In the exemplary embodiment shown in FIGS. 13 to 19, the securing device 5 furthermore has at least one rotatable joint 11, 12 for adjustment at least section-by-section between the enable position FP and the securing position SP, in particular between the intermediate position ZP and the securing position SP in the second adjusting section. In particular, the axial part 8 and the radial part 9 are connected in an adjustably movable manner by means of the at least one joint 11, 12 to change the dimension AM.

In alternative exemplary embodiments, the tool connecting device can have at least one rotatable joint for adjustment at least section-by-section between the enable position and the securing position.

In the exemplary embodiment shown in FIGS. 13 to 19, the at least one joint 11, 12 has, in particular in each case has, at least one joint pin. In alternative exemplary embodiments, the joint can be a film hinge.

In the exemplary embodiment shown in FIGS. 13 to 19, the securing device 5 furthermore has two rotatable joints 11, 12 per radial part 9'', in particular mechanically connected by means of an intermediate part.

Moreover, the at least one joint 11, 12 is designed to adjust, in particular adjusts, the radial part 9'' by the adjustment of the axial part 8.

Furthermore, the securing device 5 of the exemplary embodiment shown in FIGS. 13 to 19 may be referred to as a diaphragm spring star.

Moreover, the tool connecting device 4 and/or the securing device 5, the cover disc 4S, 5S in the exemplary embodiments shown in FIGS. 2 to 7 and 8 to 12 and the axial part 8 in the exemplary embodiment shown in FIGS. 13 to 19, extend/extends away from the cutting mechanism rotation axis 1A in a radial direction r, at least in the securing position SP.

In addition, the tool connecting device 4 and/or the securing device 5, the cover disc 4S, 5S in the exemplary embodiments shown in FIGS. 2 to 7 and 8 to 12 and the axial part 8 in the exemplary embodiment shown in FIGS. 13 to 19, completely surround/surrounds the cutting mechanism rotation axis 1A in the direction of rotation u around the cutting mechanism rotation axis 1A, at least in the securing position SP.

Figure 3:
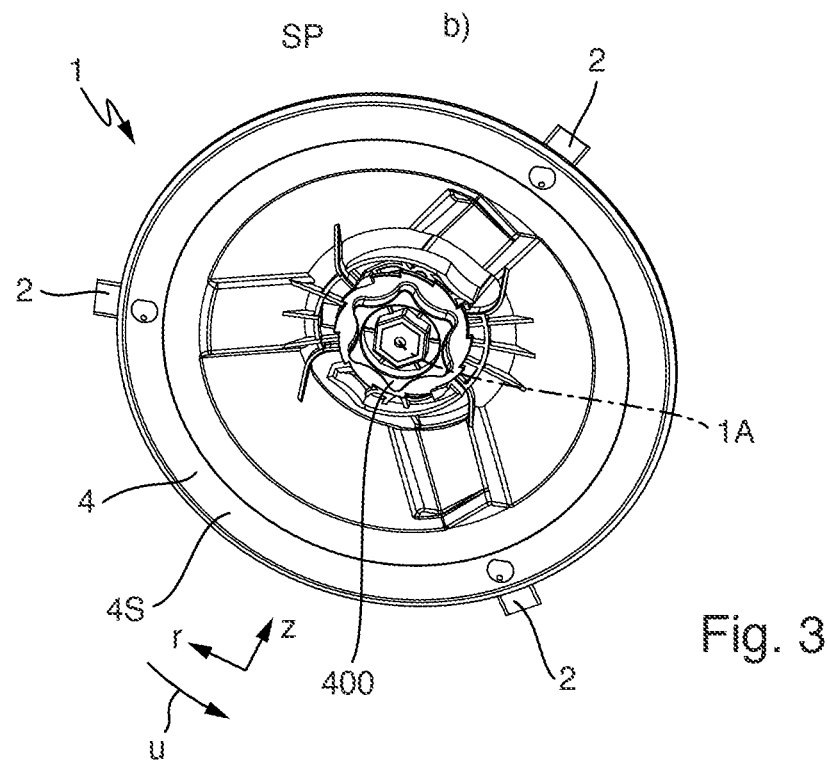
FIG. 3 shows another perspective view of the cutting mechanism of FIG. 2, and the method.
Figure 4:
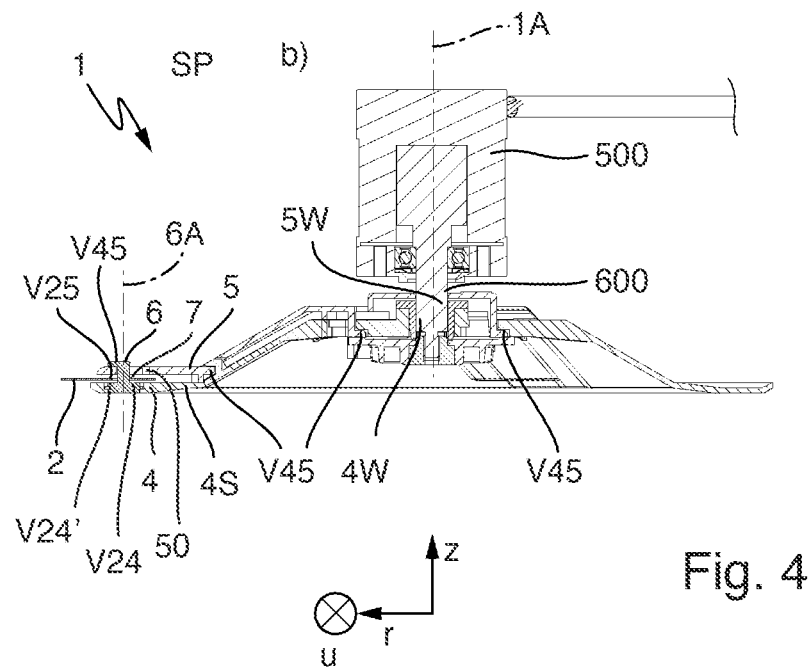
FIG. 4 shows a longitudinally sectioned view of the cutting mechanism of FIG. 2, and the method.
Figure 5:
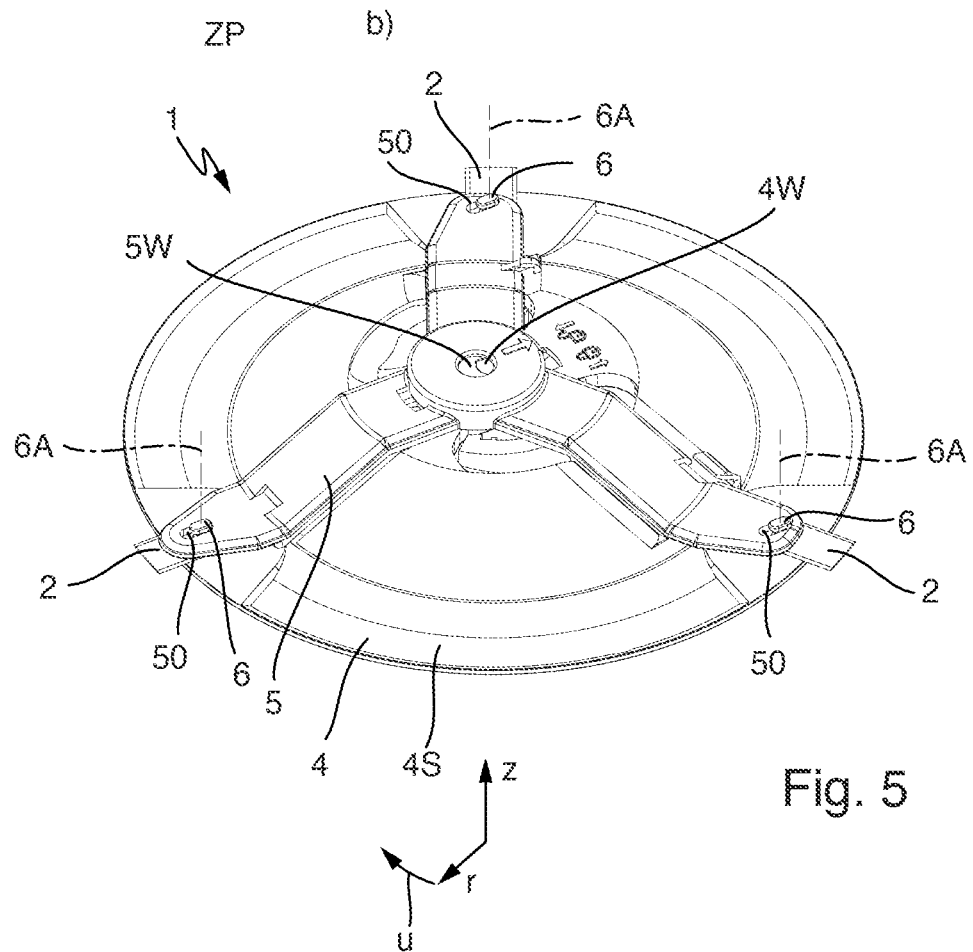
FIG. 5 shows a perspective view of the cutting mechanism of FIG. 2 in an intermediate position, and the method.
Figure 6:
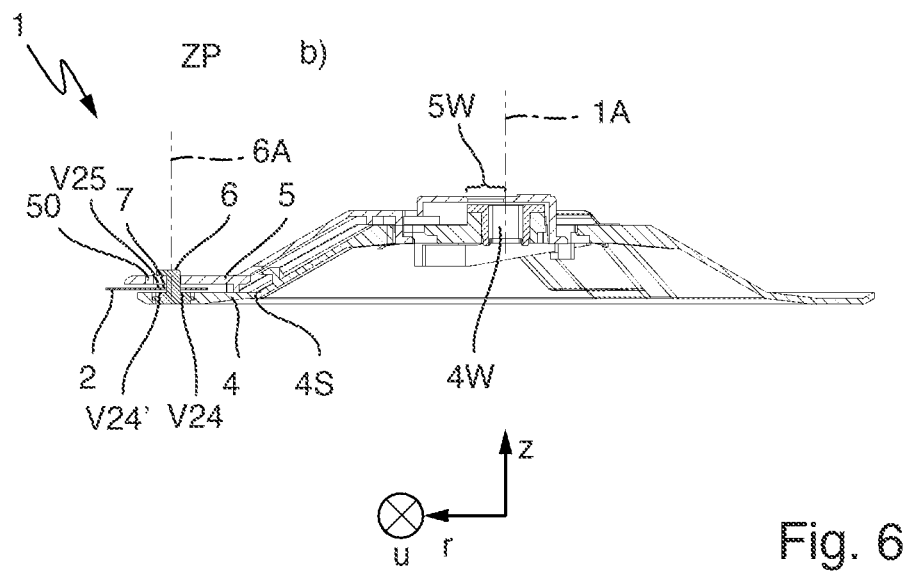
FIG. 6 shows a longitudinally sectioned view of the cutting mechanism of FIG. 5, and the method.
Figure 9:
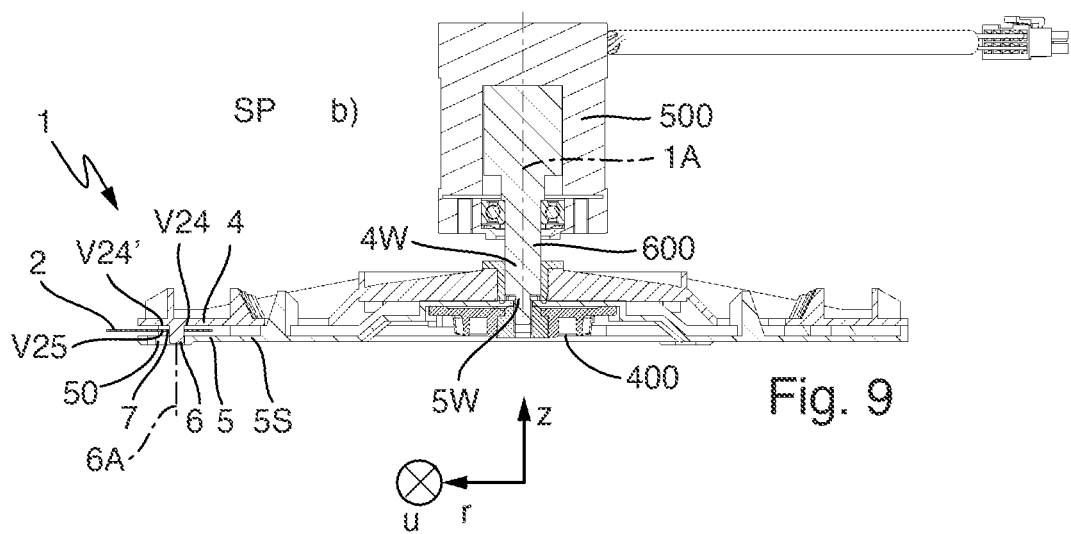
FIG. 9 shows a longitudinally sectioned view of the cutting mechanism of FIG. 8, and the method.
Figure 10:
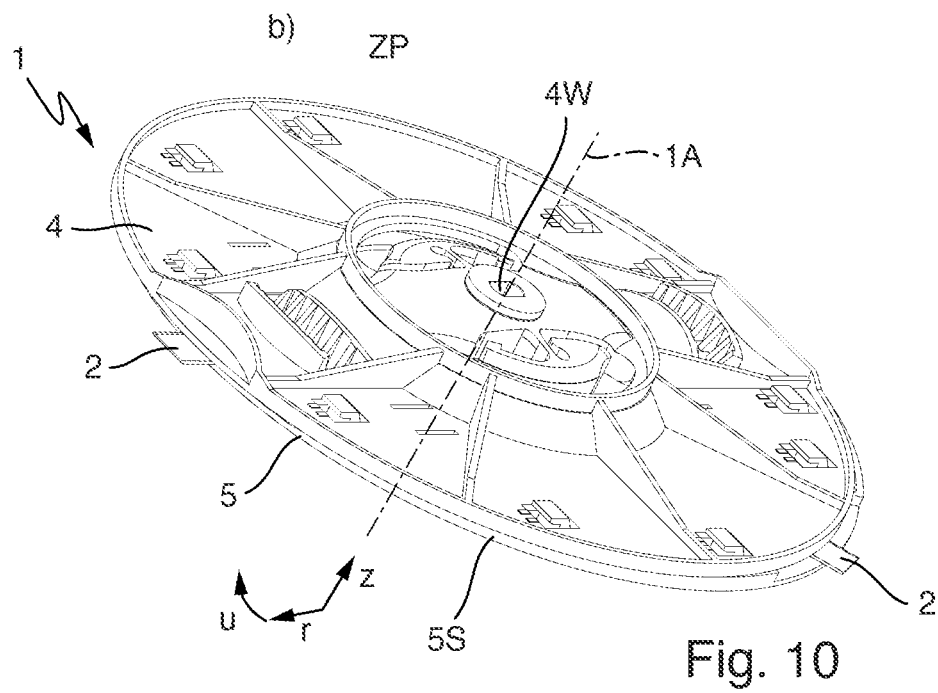
FIG. 10 shows a perspective view of the cutting mechanism of FIG. 8 in an intermediate position, and the method.
Figure 11:
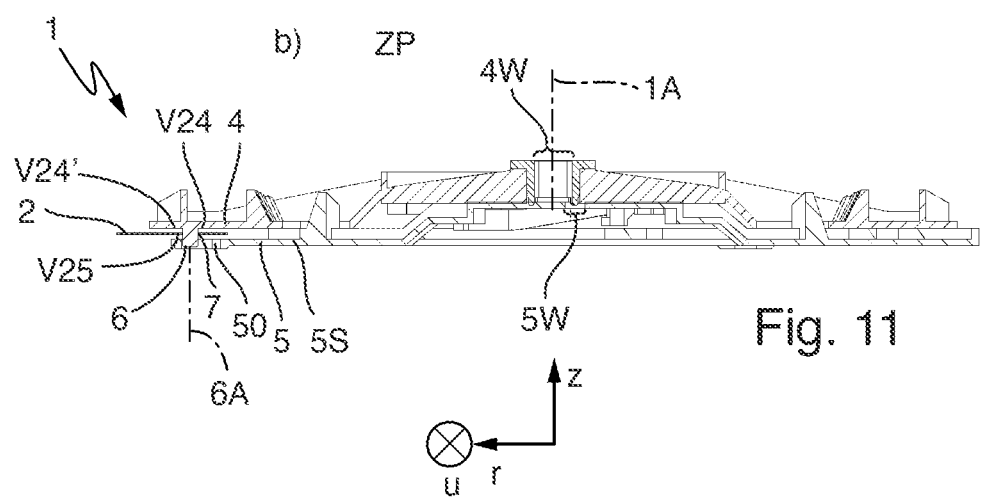
FIG. 11 shows a longitudinally sectioned view of the cutting mechanism of FIG. 10, and the method.
Figure 14:
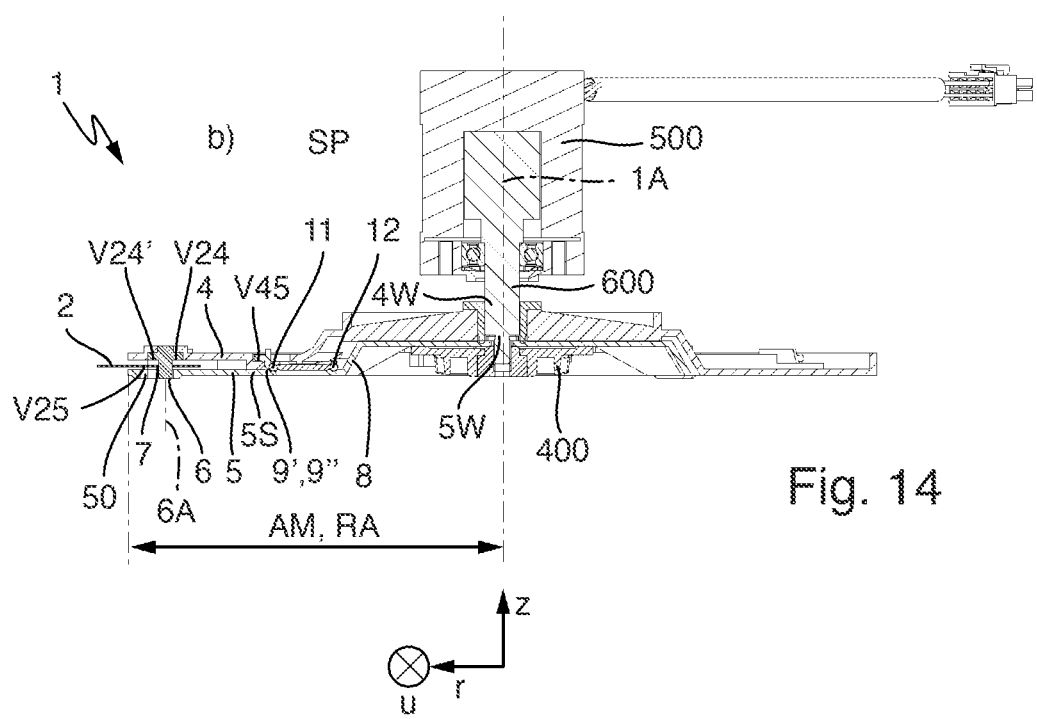
FIG. 14 shows a longitudinally sectioned view of the cutting mechanism of FIG. 13, and the method.
Figure 15:
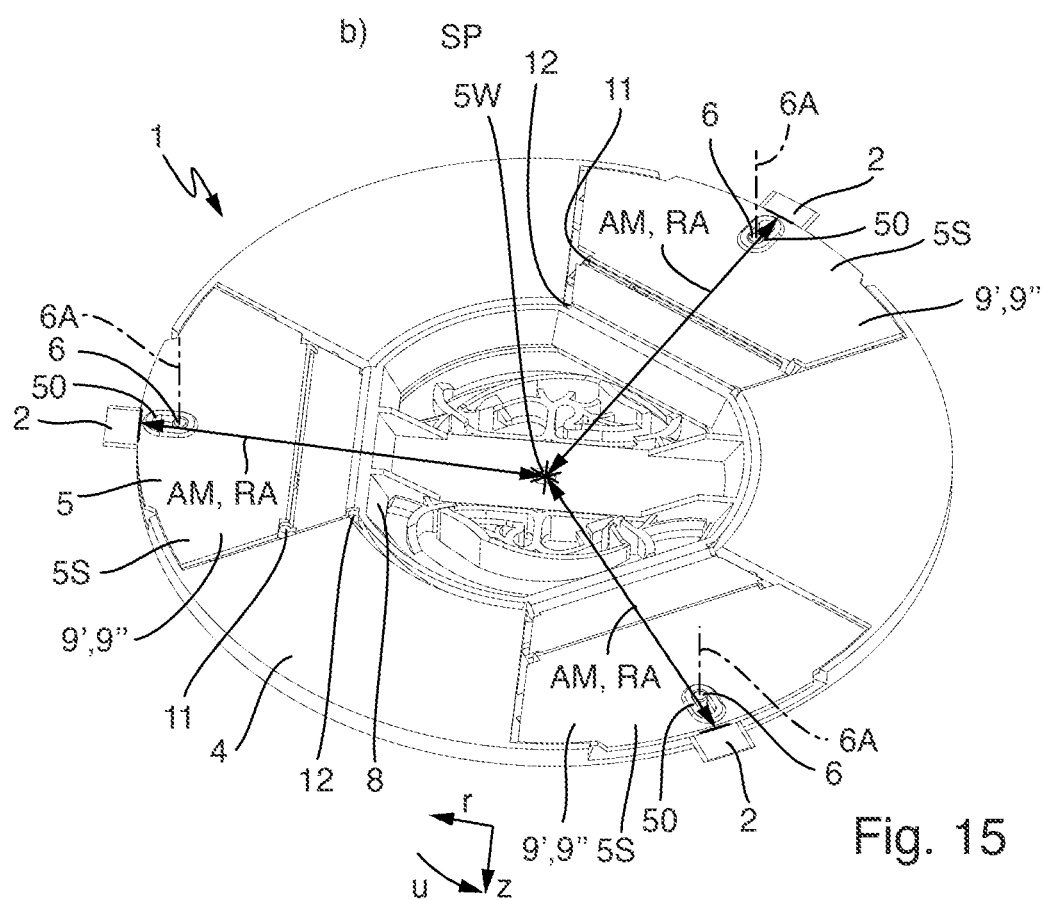
FIG. 15 shows another perspective view of the cutting mechanism of FIG. 13, and the method.
Figure 16:
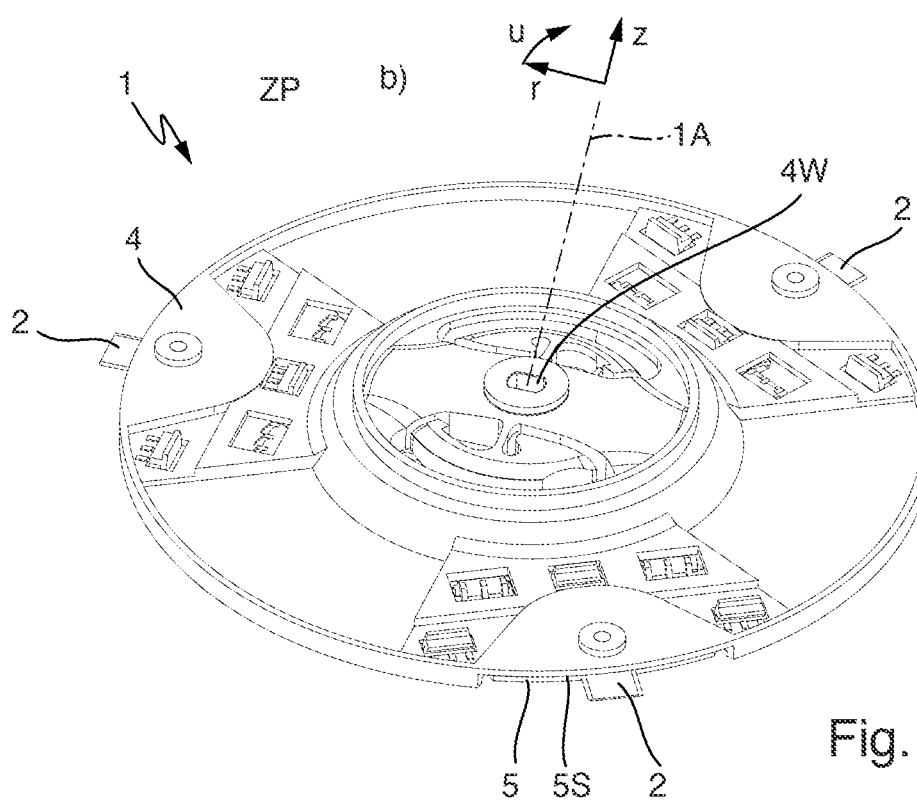
FIG. 16 shows a perspective view of the cutting mechanism of FIG. 13 in an intermediate position, and the method.
Figure 17:
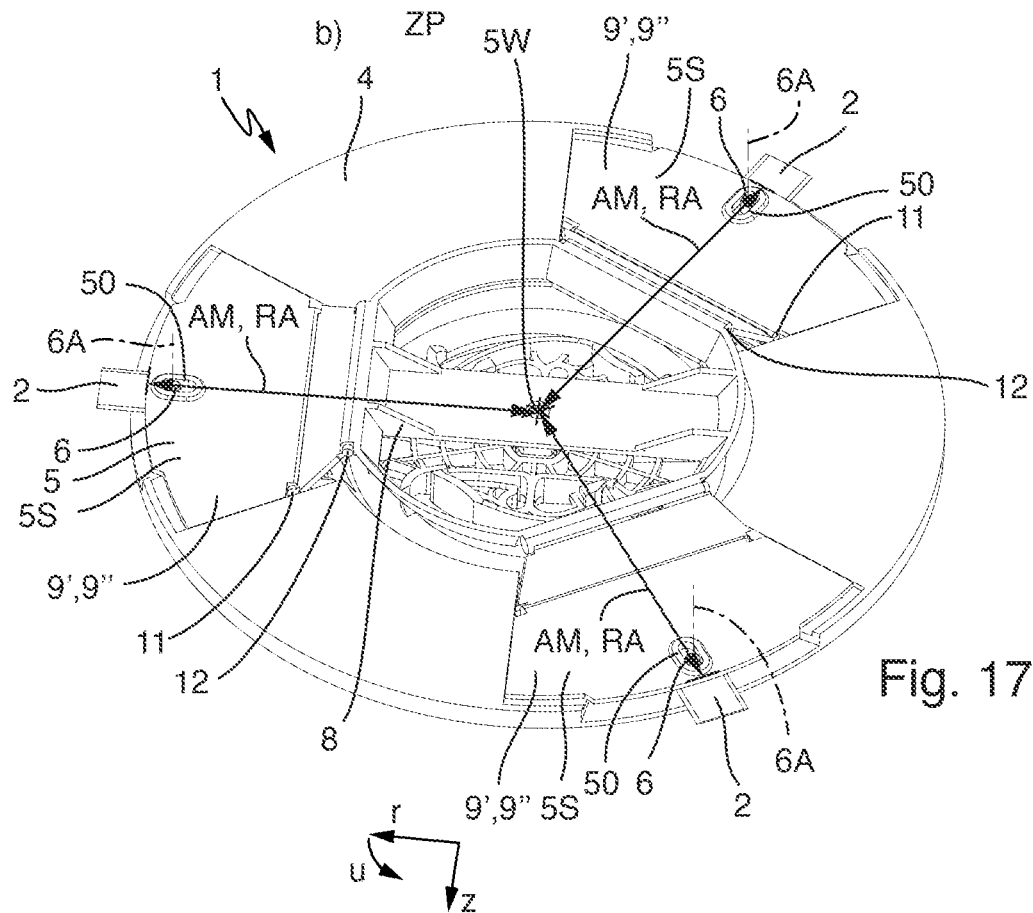
FIG. 17 shows another perspective view of the cutting mechanism of FIG. 16, and the method.
Figure 18:
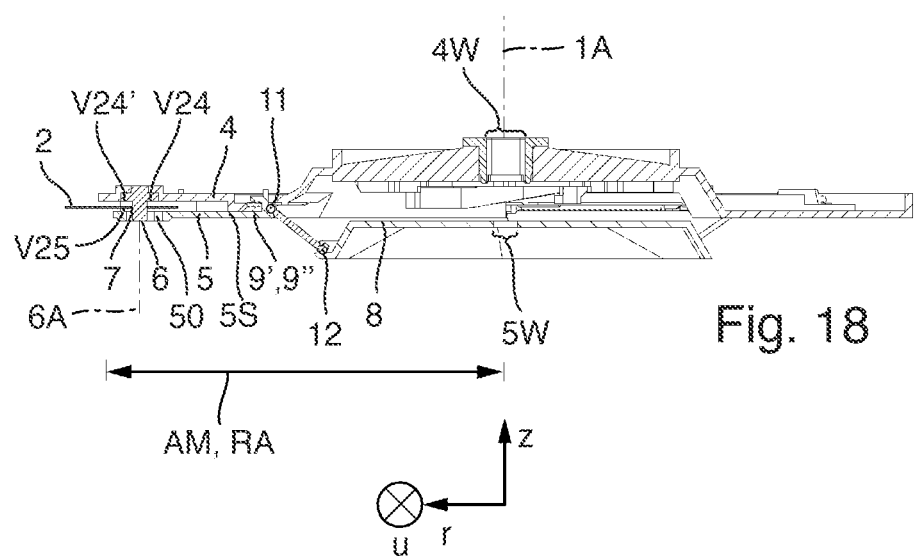
FIG. 18 shows a longitudinally sectioned view of the cutting mechanism of FIG. 16, and the method.

Furthermore, the tool connecting device 4, the cover disc 4S in the exemplary embodiment shown in FIGS. 2 to 7, has a first shaft receptacle 4W for receiving a rotation shaft 600, in particular in the axial direction −z non-orthogonal, in particular parallel, with respect to the cutting mechanism rotation axis 1A, in particular the first shaft receptacle 4W has received the rotation shaft 600, as shown in FIGS. 4, 9 and 14. The securing device 5, the cover disc 5S in the exemplary embodiments shown in FIGS. 8 to 12 and the axial part 8 in the exemplary embodiment shown in FIGS. 13 to 19, has a second shaft receptacle 5W for receiving the rotation shaft 600, in particular in the axial direction −z, in particular the second shaft receptacle 5W has received the rotation shaft 600, as shown in FIGS. 4, 9 and 14. The first shaft receptacle 4W and the second shaft receptacle 5W are designed to be adjustable, in particular are adjusted, relative to one another, in or counter to a radial direction r, −r in the exemplary embodiments shown in FIGS. 2 to 7 and 8 to 12 or in or counter to the axial direction z, −z in the exemplary embodiment shown in FIGS. 13 to 19, at least section-by-section, between the enable position FP and the securing position SP, in particular between the intermediate position ZP and the securing position SP in the second adjusting section.

Moreover, the lawnmower 100 and the motor scythe 200 have, in particular each have, such a rotation shaft 600 and a fastening element 400. The rotation shaft 600 and the cutting mechanism 1 are designed for the fastening of the cutting mechanism 1 on the rotation shaft 600 in the securing position SP, in particular only in the securing position, by means of the fastening element 400, in particular for the reception of the rotation shaft 600, in particular the cutting mechanism 1 is fastened on the rotation shaft 600, in particular on the received rotation shaft, by means of the fastening element 400 in the securing position SP, as shown in FIGS. 3, 4, 9 and 14. The rotation shaft 600, in particular the received rotation shaft, in the exemplary embodiments shown in FIGS. 2 to 7 and 8 to 12, and/or the fastening element 400 in the exemplary embodiments shown in FIGS. 8 to 12 and 13 to 19, and the fastened cutting mechanism 1 are designed to secure, in particular positively secure, in particular do secure, against adjustment, in particular of the first shaft receptacle 4W and of the second shaft receptacle 5W, into the enable position FP, in particular and the intermediate position ZP.

In particular, the fastening element 400 and the fastened cutting mechanism 1 in the exemplary embodiment shown in FIGS. 8 to 12 are designed to secure, in particular do secure, against adjustment, in particular relative adjustment, in particular of the fastening element 400 and of the securing device 5, in particular relative to one another, in or counter to a radial direction r, −r into the enable position FP, in particular and the intermediate position ZP, as shown in FIG. 9.

In the exemplary embodiments shown, the rotation shaft 600 is designed for rotation, in particular rotates, around the cutting mechanism rotation axis 1A.

Furthermore, the lawnmower 100 and the motor scythe 200 have, in particular each have, the drive motor 500 for driving the rotation shaft 600 in rotation around the cutting mechanism rotation axis 1A.

Moreover, the fastening element 400 is in the form of a nut. In alternative exemplary embodiments, the fastening element need not or may not be in the form of a nut.

As the exemplary embodiments shown and described above make clear, the invention provides a cutting mechanism for a lawnmower and/or a motor scythe, a lawnmower and/or a motor scythe having a cutting mechanism of this kind, and/or a method for assembling a cutting mechanism of this kind and/or a lawnmower of this kind and/or a motor scythe of this kind, which each have/has improved characteristics.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cutting mechanism for a lawnmower and/or a motor scythe, comprising:
  at least one tool device, wherein the tool device is designed for cutting grass;
  a tool connecting device, wherein the tool connecting device is designed for rotation around a cutting mechanism rotation axis of the cutting mechanism, and wherein the tool connecting device and the tool device are designed to form a positive connection to one another in order to secure the tool device, when positively connected, against being released from the tool connecting device radially in a radial direction with respect to the cutting mechanism rotation axis; and
  a securing device, wherein the securing device and the tool connecting device are designed to be at least partially adjustable relative to one another for enabling establishment and/or release of the positive connection and a securing position for securing the positive connection against release,
  wherein the securing device and the tool connecting device are designed to be at least partially adjustable relative to one another in an axial direction non-orthogonal with respect to the cutting mechanism rotation axis in a first adjusting section between the enable position and an intermediate position, and only in, or counter to, a radial direction in a second adjusting section, the second adjusting section being different from the first adjusting section, between the intermediate position and the securing position,
  wherein the radial direction is orthogonal to a direction of the rotation around the cutting mechanism rotation axis.

2. The cutting mechanism according to claim 1, wherein the tool device or the tool connecting device has a pin, the tool connecting device or the tool device has a pin receptacle,
  the pin and the pin receptacle are designed for the pin to be received in the pin receptacle in a direction parallel to a pin longitudinal axis in order to form the positive connection, and
  the pin longitudinal axis is non-orthogonal with respect to the cutting mechanism rotation axis.

3. The cutting mechanism according to claim 1, wherein at least one of:
  (i) the tool connecting device and the tool device are designed to form a positive connection to one another, at least in the securing position in order to secure the positively connected tool device against release from the tool connecting device in an axial direction non-orthogonal with respect to the cutting mechanism rotation axis,
  (ii) the securing device and the tool device are designed to form a positive connection to one another in the securing position in order to secure the positively connected tool device against release from the securing device in an axial direction non-orthogonal with respect to the cutting mechanism rotation axis, or
  (iii) the securing device and the tool connecting device are designed to form a positive connection to one another in the securing position in order to secure the securing device and the tool connecting device against release from one another in an axial direction non-orthogonal with respect to the cutting mechanism rotation axis.

4. The cutting mechanism according to claim 3, wherein the tool connecting device or the securing device has a cover disc,
the cover disc is designed for rotation around the cutting mechanism rotation axis and for covering the positive connection of the tool connecting device and the tool device to one another and/or of the securing device and the tool device to one another in an axial direction non-orthogonal with respect to the cutting mechanism rotation axis.

5. The cutting mechanism according to claim 4, wherein the cutting mechanism has a plurality of the tool devices, wherein the plurality of tool devices are designed for cutting grass;
the tool connecting device and the tool devices are designed to form positive connections to one another in order to secure the tool devices, when positively connected, against being released from the tool connecting device radially in different radial directions with respect to the cutting mechanism rotation axis; and
the securing device and the tool connecting device are designed to be at least partially adjustable relative to one another between the enable position for enabling the establishment and/or release of the positive connections and the securing position for securing the positive connections against release.

6. The cutting mechanism according to claim 5, wherein
(i) the securing device and the tool connecting device are designed to be fully adjustable relative to one another in, or counter to, only a single radial direction, at least section-by-section, between the enable position and the securing position, or
(ii) the securing device and the tool connecting device are designed to be adjustable with a plurality of parts relative to one another in, or counter to, different radial directions, at least section-by-section, between the enable position and the securing position.

7. The cutting mechanism according to claim 6, wherein the securing device or the tool connecting device is designed for changing at least one dimension in a radial direction for adjustment, at least section-by-section, between the enable position and the securing position.

8. The cutting mechanism according to claim 7, wherein the dimension is a radius.

9. The cutting mechanism according to claim 7, wherein the securing device or the tool connecting device has an axial part and at least one radial part movably connected to the axial part,
the axial part is designed to be adjustable in an axial direction non-orthogonal with respect to the cutting mechanism rotation axis, and
the radial part is designed to be adjustable in an at least partial radial direction to change the dimension.

10. The cutting mechanism according to claim 9, wherein the securing device or the tool connecting device has at least one rotatable joint for adjustment at least section-by-section between the enable position and the securing position, and
the axial part and the radial part are connected in an adjustably movable manner via the at least one rotatable joint to change the dimension.

11. The cutting mechanism according to claim 9, wherein at least one of:
(i) the cover disc and/or the axial part extends away from the cutting mechanism rotation axis in a radial direction, at least in the securing position, or
(ii) the cover disc and/or the axial part, completely surrounds the cutting mechanism rotation axis in a direction of rotation around the cutting mechanism rotation axis, at least in the securing position.

12. A cutting mechanism for a lawnmower and/or a motor scythe, comprising:
at least one tool device, wherein the tool device is designed for cutting grass;
a tool connecting device, wherein the tool connecting device is designed for rotation around a cutting mechanism rotation axis of the cutting mechanism, and wherein the tool connecting device and the tool device are designed to form a positive connection to one another in order to secure the tool device, when positively connected, against being released from the tool connecting device radially in a radial direction with respect to the cutting mechanism rotation axis; and
a securing device, wherein the securing device and the tool connecting device are designed to be at least partially adjustable relative to one another in, or counter to, an at least partial radial direction between an enable position for enabling establishment and/or release of the positive connection and a securing position for securing the positive connection against release, wherein
the radial direction is orthogonal to a direction of the rotation around the cutting mechanism rotation axis,
the tool connecting device comprises a first shaft receptacle for receiving a rotation shaft in an axial direction non-orthogonal with respect to the cutting mechanism rotation axis,
the securing device comprises a second shaft receptacle for receiving the rotation shaft in the axial direction, and
the first shaft receptacle and the second shaft receptacle are designed to be adjustable relative to one another in, or counter to, a radial direction and/or in, or counter to, the axial direction between the enable position and the securing position.

13. A lawnmower and/or motor scythe, wherein the lawnmower and/or the motor scythe comprises:
a cutting mechanism comprising:
at least one tool device, wherein the tool device is designed for cutting grass;
a tool connecting device, wherein the tool connecting device is designed for rotation around a cutting mechanism rotation axis of the cutting mechanism, and wherein the tool connecting device and the tool device are designed to form a positive connection to one another in order to secure the tool device, when positively connected, against being released from the tool connecting device radially in a radial direction with respect to the cutting mechanism rotation axis; and
a securing device, wherein the securing device and the tool connecting device are designed to be at least partially adjustable relative to one another in, or counter to, an at least partial radial direction between an enable position for enabling establishment and/or release of the positive connection and a securing position for securing the positive connection against release, wherein
the radial direction is orthogonal to a direction of the rotation around the cutting mechanism rotation axis,
the lawnmower and/or motor scythe further comprising:
a rotation shaft; and
a fastening element, wherein the tool connecting device of the cutting mechanism comprises a first shaft receptacle for receiving the rotation shaft in an axial direction non-orthogonal with respect to the cutting mechanism rotation axis, the securing device of the cutting mechanism comprises a second shaft receptacle for receiving the rotation shaft in the axial direction, and the first shaft receptacle and the second shaft receptacle are designed to be adjustable relative to one another in, or counter to, a radial direction and/or in, or counter to, the axial direction between the enable position and the securing position, the rotation shaft and the cutting mechanism are designed for fastening the cutting mechanism on the rotation shaft only in the securing position, by way of the fastening element, for the reception of the rotation shaft, and the received rotation shaft and/or the fastening element and the fastened cutting mechanism are designed so as to be secured against adjustment of the first shaft receptacle and the second shaft receptacle into the enable position.

14. A method for assembling a cutting mechanism for a lawnmower and/or a motor scythe, the cutting mechanism comprising:

at least one tool device, a tool connecting device, and a securing device, the method comprising the steps of:
 a) establishing a positive connection of the tool connecting device and the tool device to one another, wherein the tool connecting device is designed for rotation around a cutting mechanism rotation axis of the cutting mechanism, and wherein the tool connecting device and the tool device are designed to form the positive connection to one another in order to secure the tool device, when positively connected, against being released from the tool connecting device radially in a radial direction with respect to the cutting mechanism rotation axis; and
 b) adjusting the securing device and the tool connecting device at least partially relative to one another between an enable position and a securing position, wherein the securing device and the tool connecting device are designed to be at least partially adjustable relative to one another for enabling the establishment and/or release of the positive connection and the securing position for securing the positive connection against release, the securing device and the tool connecting device being partially adjusted relative to one another in an axial direction non-orthogonal with respect to the cutting mechanism rotation axis in a first adjusting section between the enable position and an intermediate position, and only in, or counter to, a radial direction in a second adjusting section, the second adjusting section being different from the first adjusting section, between the intermediate position and the securing position, wherein the radial direction is orthogonal to a direction of the rotation around the cutting mechanism rotation axis.

15. A cutting mechanism for a lawnmower and/or a motor scythe, comprising:

at least one tool device, wherein the tool device is designed for cutting grass;

a tool connecting device, wherein the tool connecting device is designed for rotation around a cutting mechanism rotation axis of the cutting mechanism, and wherein the tool connecting device and the tool device are designed to form a positive connection to one another in order to secure the tool device, when positively connected, against being released from the tool connecting device radially in a radial direction with respect to the cutting mechanism rotation axis; and a securing device, wherein the securing device and the tool connecting device are designed to be at least partially adjustable relative to one another in, or counter to, an at least partial radial direction between an enable position for enabling establishment and/or release of the positive connection and a securing position for securing the positive connection against release, wherein the radial direction is orthogonal to a direction of the rotation around the cutting mechanism rotation axis, the tool device or the tool connecting device has a pin, the tool connecting device or the tool device has a pin receptacle, the pin and the pin receptacle are designed for the pin to be received in the pin receptacle in a direction parallel to a pin longitudinal axis in order to form the positive connection, and the pin longitudinal axis is non-orthogonal with respect to the cutting mechanism rotation axis, wherein at least one of:
 (i) the tool connecting device and the tool device are designed to form a positive connection to one another, at least in the securing position in order to secure the positively connected tool device against release from the tool connecting device in an axial direction non-orthogonal with respect to the cutting mechanism rotation axis,
 (ii) the securing device and the tool device are designed to form a positive connection to one another in the securing position in order to secure the positively connected tool device against release from the securing device in an axial direction non-orthogonal with respect to the cutting mechanism rotation axis, or
 (iii) the securing device and the tool connecting device are designed to form a positive connection to one another in the securing position in order to secure the securing device and the tool connecting device against release from one another in an axial direction non-orthogonal with respect to the cutting mechanism rotation axis;

wherein the securing device has a cover disc, and the cover disc is designed for rotation around the cutting mechanism rotation axis and for covering the positive connection of the tool connecting device and the tool device to one another and/or of the securing device and the tool device to one another in an axial direction non-orthogonal with respect to the cutting mechanism rotation axis, and wherein the tool connecting device is disc-shaped.

16. The cutting mechanism according to claim 3, wherein the axial direction secured against release of the tool connecting device and the tool device is counter to the axial direction secured against release of the securing device and the tool device.

* * * * *